US007941236B2

(12) United States Patent  
Spearman

(10) Patent No.: US 7,941,236 B2  
(45) Date of Patent: May 10, 2011

(54) METHODS AND SYSTEMS FOR EMPLOYING DYNAMIC RISK-BASED SCHEDULING TO OPTIMIZE AND INTEGRATE PRODUCTION WITH A SUPPLY CHAIN

(75) Inventor: Mark L. Spearman, Bryan, TX (US)

(73) Assignee: Factory Physics, Inc., Bryan, TX (US)

( * ) Notice: Subject to any disclaimer, the term of this patent is extended or adjusted under 35 U.S.C. 154(b) by 551 days.

(21) Appl. No.: 11/822,564

(22) Filed: Jul. 6, 2007

(65) Prior Publication Data

US 2008/0015721 A1 Jan. 17, 2008

Related U.S. Application Data

(60) Provisional application No. 60/819,012, filed on Jul. 7, 2006.

(51) Int. Cl.
*G06F 19/00* (2006.01)
*G06Q 10/00* (2006.01)

(52) U.S. Cl. ............ 700/95; 700/99; 700/102; 700/103; 705/7; 705/8; 705/28

(58) Field of Classification Search .................... 700/95, 700/102, 103, 99; 705/7, 8, 28
See application file for complete search history.

(56) References Cited

U.S. PATENT DOCUMENTS

| 5,287,267 | A | * | 2/1994 | Jayaraman et al. ............. 705/10 |
| 5,335,179 | A | * | 8/1994 | Boka et al. ...................... 701/13 |
| 5,963,919 | A | * | 10/1999 | Brinkley et al. ................ 705/28 |
| 6,151,582 | A | * | 11/2000 | Huang et al. ..................... 705/8 |
| 2002/0072988 | A1 | | 6/2002 | Aram |
| 2002/0188529 | A1 | * | 12/2002 | Krever ............................ 705/28 |
| 2004/0064382 | A1 | | 4/2004 | Negron |
| 2004/0153187 | A1 | * | 8/2004 | Knight et al. .................... 700/99 |
| 2005/0060245 | A1 | * | 3/2005 | Hoffman et al. ................ 705/28 |
| 2005/0256787 | A1 | * | 11/2005 | Wadawadigi et al. .......... 705/28 |

(Continued)

OTHER PUBLICATIONS

H. Missbauer, "Aggregate Order Release Planning for Time-Varying Demand", International Journal of Production Research, vol. 40, Issue 3 Feb. 2002, pp. 699-718.*

(Continued)

*Primary Examiner* — Albert Decady
*Assistant Examiner* — Jason Lin
(74) *Attorney, Agent, or Firm* — McGuireWoods, LLP

(57) ABSTRACT

A production and inventory control for a manufacturing facility is provided that facilitates and coordinates improved planning and execution of such facility in a supply chain with a focus on providing an improved and robust planning, production and inventory control, even in the presence of uncertainty. This may include Optimal Planning that can balance the need for low inventory, low cost (i.e., high utilization of equipment and labor), and efficient on-time delivery. The result of such planning is not a schedule per se but a set of parameters that form a dynamic policy that generates an evolving schedule as conditions (demand, production) materialize. An Optimal Execution applies the dynamic policy resulting in a manufacturing system that is robust enough to accommodate moderate changes in demand and/or capacity without the need to reschedule. Optimal Execution may also involve a "Capacity Trigger" that detects when the assumptions regarding demand and capacity used to determine the dynamic policy are no longer valid. The Capacity Trigger also may provide a Trigger Signal to the planner indicating the need for either more or less capacity.

15 Claims, 24 Drawing Sheets

U.S. PATENT DOCUMENTS

| | | | |
|---|---|---|---|
| 2006/0015415 A1 | 1/2006 | Naimi | |
| 2006/0031840 A1 | 2/2006 | Yigit et al. | |
| 2006/0085235 A1* | 4/2006 | Nguyen et al. | 705/7 |
| 2006/0167732 A1* | 7/2006 | Ricketts | 705/8 |
| 2006/0235557 A1* | 10/2006 | Knight et al. | 700/103 |
| 2007/0027636 A1* | 2/2007 | Rabinowitz | 702/20 |

OTHER PUBLICATIONS

Udy S. Karmarkar, Sham Kekre, Sunder Kekre, "Multi-item batching heuristics for minimization of queueing delays", European Journal of Operational Research 58 (1992) pp. 99-111, 1992, Elsevier Science Publishers B.V.

Udy S. Karmarkar, Sham Kekre, Sunder Kekre, Susan Freeman, "Lot Sizing and Lead-time Performance in a Manufacturing Cell", Interfaces, vol. 15, No. 2, (Mar.-Apr. 1985), pp. 1-9.

Uday S. Karmarkar, "Lot-Sizing and Sequencing Delays", Management Science, vol. 33, No. 3, Mar. 1987, pp. 419-423.

Gregory Dobson, Uday S. Karmarkar, Jeffrey L. Rummel, "Batching to Minimize Flow Times on Parallel Heterogeneous Machines", Management Science, vol. 35, No. 5, May 1989, pp. 607-613.

Uday S. Karmarkar, Sham Kekre, Sunder Kekre, "Lotsizing in Multi-Item Multi-Machine Job Shops", IIE Transactions, vol. 17, No. 3, Sep. 1985, pp. 290-298.

Uday S. Karmarkar, "Lot Sizes, Lead Times and In-Process Inventories", Management Science, vol. 33, No. 3, Mar. 1987, pp. 409-418.

Notification of Transmittal of International Search Report and Written Opinion of the International Searching Authority, or the Declaration, International Search Report and Written Opinion of the International Searching Authority, all mailed Sep. 19, 2008.

Paul H. Zipkin, "Several Items with Stochastic Demands," Foundations of Inventory Management, Chapter 8, McGraw-Hill 2000, pp. 295-365.

IBM, "Communications Oriented Production Information and Control System," vol. I, 1973, pp. 40, 46 and 49.

Edward A. Silver, David F. Pyke, Rein Peterson, "Inventory Management and Production Planning and Scheduling," pp. 44-67, Jan. 1998.

Edward A. Silver, David F. Pyke, Rein Peterson, "Inventory Management and Production Planning and Scheduling," pp. 280-294, Jan. 1998.

Edward A. Silver, David F. Pyke, Rein Peterson, "Inventory Management and Production Planning and Scheduling," pp. 372-376 Jan. 1998.

Silke Kröckel, "Stochastic Production-Inventory Systems with Significant Setup Times," Apr. 2002, pp. 79-124.

Wallace J. Hopp, Mark L. Spearman, Factory Physics, Foundations of Manufacturing Management, Second Edition, Chapter 10, "Push and Pull Production Systems," Irwin/McGraw-Hill, 2001, pp. 339-364.

Wallace J. Hopp, Mark L. Spearman, Factory Physics, Foundations of Manufacturing Management, Second Edition, Chapter 13, "A Pull Planning Framework," Irwin/McGraw-Hill, 2001, pp. 408-452.

Wallace J. Hopp, Mark L. Spearman, Factory Physics, Foundations of Manufacturing Management, Second Edition, Chapter 14, "Shop Floor Control," Irwin/McGraw-Hill, 2001, pp. 453-487.

Wallace J. Hopp, Mark L. Spearman, Factory Physics, Foundations of Manufacturing Management, Second Edition, Chapter 15, "Production Scheduling," Irwin/McGraw-Hill, 2001, pp. 488-534.

Factory Physics, "Small Parts, Inc. Lean Physics Implementation Proposal," Nov. 9, 2003, pp. 1-3.

Ford W. Harris, "How Many Parts to Make At Once," 1913, pp. 135-136 and 152.

Press, Flannery, Teukolsky and Vetterling, "Numerical Recipes: The Art of Scientific Computing," Cambridge University Press, 1986, pp. 297-301.

Excerpts from i2 Technology, Inc., Form 10-K for FY ending Dec. 31, 1997, 8 pages.

Invoice 000710A to Alcoa Technical Center from SAK Logistics, Inc., 1 page Jul. 10, 2000.

SAK Logistics, Inc., "Conwip & Kanban Estimator Installation Instructions," 2000, 3 pages.

Glen Gerecke, Tom Knight, "Improving Performance and Reducing Cycle Time Using Flow Path Management: A Case Study," Pharmaceutical Engineering, Nov./Dec. 2001, vol. 21 No. 6, pp. 1-8.

Invoices 000503A, 000612A and 000705A to Innovative Home Products, 3 pages May 3, 2000.

Innovative Home Products, "Exchange Curve: Cycle Stock Investment vs. Number of Orders per Year, 4 pages 2000.

Wallace J. Hopp, Mark L. Spearman, Rachel Q. Zhang, "Easily Implementable Inventory Control Policies," Operations Research, vol. 45, No. 3, May-Jun. 1997.

Oracle, "Oracle Advanced Supply Chain Planning and Oracle Global ATP Server User Guide," Release R11i, Feb. 2000, pp. 12-1 to 12-20, pp. A-1 to A-4, pp. B-1 to B-4, pp. C-1 to C-4.

SAP Advanced Planner & Optimizer, "Production Planning and Detailed Scheduling," Dec. 1999 SAP AG, 10 pages.

Nancy Lea Hyer, Urban Wemmerlöv, "Capabilities of Group Technology," Reprinted from 2$^{nd}$ Quarter 1985 Production and Inventory Management, Journal of American Production and Inventory Control Society, pp. 67-84.

Wallace J. Hopp, Mark L. Spearman, Factory Physics, Foundations of Manufacturing Management, Second Edition, Irwin/McGraw-Hill, 2001.

* cited by examiner $$Q_i = \sqrt{\frac{2D_i(V_i + \sum_k \lambda_k \alpha_{k,i})}{h_i C_i}}$$

where $D_i$ = demand for part $i$ $V_i$ = OOP cost for part $i$ $\lambda_k$ = LaGrange multiplier for resource $k$ $\alpha_{k,i}$ = $\sum_j f_{i,j} S_j \delta_{k,j}$ $f_{i,j}$ = part $i$ demand fraction visiting operation $j$ $S_j$ = setup time for operation $j$ $\delta_{k,j}$ = 1 if $k = j$ and zero, otherwise.

Figure 15

| Process Center ID | Description | Period | Time Available (Hrs./Period) | Time Used (Hrs./Period) | Max Allowed Utilization (%) | Utilization (%) | Available Time Remaining | Cost Decrease Per Extra Hour Available ($) |
|---|---|---|---|---|---|---|---|---|
| PC 1 | PC 1 | Year | 4,000.0000 | 3,162.1716 | 100.0000 % | 79.0543 % | 0.1061 | 41.0088 |
| PC 2 | PC 2 | Year | 4,000.0000 | 1,225.3330 | 100.0000 % | 30.6333 % | 774.6670 | 0.0000 |
| PC 3 | PC 3 | Year | 3,800.0000 | 587.9441 | 95.0000 % | 15.4722 % | 2,642.0559 | 0.0000 |

Figure 19

CONWIP Sequence

Beginning Completed Date: 9/21/2006    Refresh  Back  Sequencing

| Product Flow | Units | WIP Limit (units) | Status Date & Time | Schedule Start | Schedule End |
|---|---|---|---|---|---|
| Cell 7 | 2L3256 | 5,200.00 | 9/26/2006 12:00 AM | 9/1/2006 | 9/30/2006 |

| Seq. Nr. | Item ID | Job ID | Batch ID | Process Center | Open Qty | Due Date | Early Completion | Late Completion | Expected Completion | Planned Prod. Rate (units/hr) | Material Status | Due Date Status | Job Status |
|---|---|---|---|---|---|---|---|---|---|---|---|---|---|
| 0 | RSC4512 | 564487 | 564487 | 210-CELL7 | 0.00 | 9/15/2006 | 9/22/2006 | 9/22/2006 | 9/22/2006 12:00 AM | | | Completed | Completed |
| 0 | 2L3256 | 561491 | 561491 | 210-CELL7 | -6.00 | 9/5/2006 | 9/25/2006 | 9/25/2006 | 9/25/2006 12:00 AM | 660.88 | | Completed | WIP |
| 1 | 2L3256 | 564489 | 564489 | 210-CELL7 | 19,785.00 | 9/7/2006 | 9/26/2006 | 9/26/2006 | 9/27/2006 1:55 PM | | | Late | WIP |
| 2 | 2L3257 | 561492 | 561492 | 210-CELL7 | 15,861.00 | 9/11/2006 | 9/26/2006 | 9/26/2006 | 9/28/2006 9:56 PM | | | Late | Wait |
| 3 | 032919070 | 561490 | 561490 | 210-CELL7 | 96.00 | 9/12/2006 | 9/26/2006 | 9/26/2006 | 9/29/2006 10:49 PM | | | Late | WIP |
| 4 | 2L3257 | 564490 | 564490 | 210-CELL7 | 5,287.00 | 9/11/2006 | 9/26/2006 | 9/26/2006 | 9/29/2006 2:49 PM | | | Late | Wait |
| 5 | 032926437 | 558614 | 558614 | 210-CELL7 | 88.00 | 9/13/2006 | 9/26/2006 | 9/26/2006 | 9/29/2006 4:27 PM | | | Late | WIP |
| 6 | SC4482 | 564492 | 564492 | 210-CELL7 | 18.00 | 9/26/2006 | 9/26/2006 | 9/26/2006 | 9/29/2006 4:30 PM | | | Late | WIP |
| 7 | RSC4482 | 561487 | 561487 | 210-CELL7 | 70.00 | 9/27/2006 | 9/26/2006 | 9/26/2006 | 9/29/2006 4:43 PM | | | Late | WIP |
| 8 | RSC4462E | 562386 | 562386 | 210-CELL7 | 2,624.00 | 9/28/2006 | 9/26/2006 | 9/26/2006 | 9/30/2006 12:43 AM | | | Late | Wait |

Figure 22

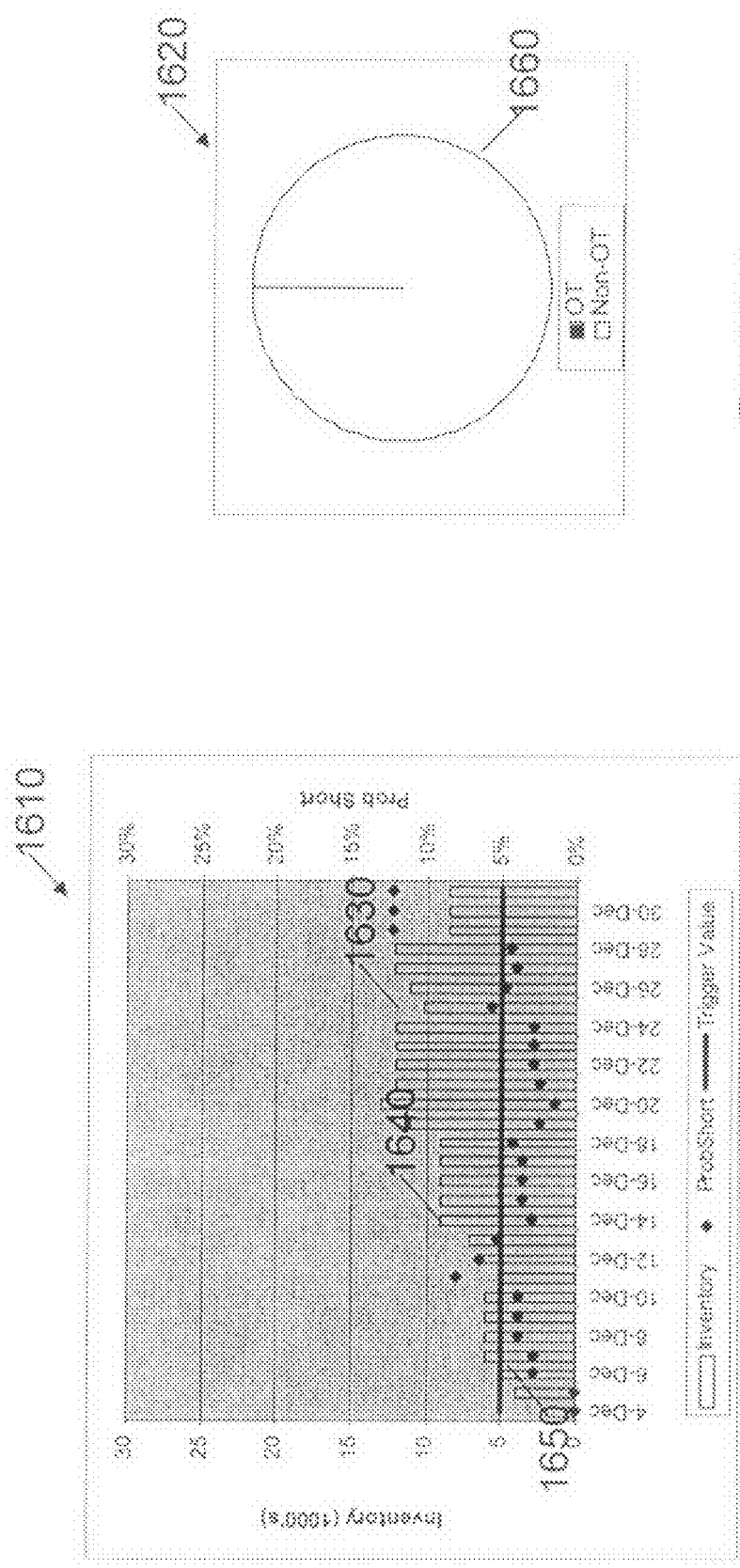

METHODS AND SYSTEMS FOR EMPLOYING DYNAMIC RISK-BASED SCHEDULING TO OPTIMIZE AND INTEGRATE PRODUCTION WITH A SUPPLY CHAIN

CROSS-REFERENCE TO RELATED APPLICATIONS

This application claims priority to U.S. Provisional Application No. 60/819,012 entitled, "METHOD FOR EMPLOYING DYNAMIC RISK-BASED SCHEDULING TO OPTIMIZE AND INTEGRATE PRODUCTION WITH A SUPPLY CHAIN," filed Jul. 7, 2006, the disclosure of which is incorporated by reference herein in its entirety.

BACKGROUND OF THE INVENTION 1.0 Field of the Invention

The invention relates generally to production and inventory control of a manufacturing facility or network of facilities and, more specifically, to a system and method that facilitates and coordinates improved planning and execution of such facilities in a supply chain with a focus on an improved planning, production and inventory control that is robust and effective, even in the presence of uncertainty.

2.0 Related Art

In recent years, companies have begun to appreciate the severity of the risks facing an entire corporation by not addressing potential supply chain problems. Indeed, more than two thirds of the companies surveyed by Accenture in 2006 said it had experienced a supply chain disruption from which it took more than one week to recover. Furthermore, the study revealed that 73% of the executives surveyed had a major disruption in the past 5 years. Of those, 36% took more than one month to recover. One reason for this maybe that supply chains are (1) not designed with risk in mind and (2) are not robust enough to operate under conditions significantly different from those for which they are planned.

For many years, people have sought to develop processes that will generate optimal plans and schedules for managing production systems and their supply chains. The goal has been to reduce inventory, improve customer service, and to reduce cost by increasing the utilization of expensive equipment and labor. Unfortunately, these processes have not explicitly considered risk and have ignored key facts regarding the systems they try to control.

The first attempts in this area date back to the 1960's beginning with Material Requirements Planning (MRP) that provided material plans with no consideration of capacity. This evolved into Manufacturing Resources Planning (MRP II), which provided some capacity checking modules around the basic MRP functionality and, eventually, into the Enterprise Resources Planning (ERP) systems used today.

In the remainder of this application, any production planning system will be referred to as an ERP system whether it carries that moniker or not. These can include so-called "legacy" systems that may employ only basic functionality such as MRP. Likewise, any system that is used to directly control execution, whether it is part of an ERP system or not, will be referred to as a "Manufacturing Execution System" (MES).

Interestingly, virtually all ERP systems today (including the high end offerings of SAP and Oracle) provide MRP functions and continue to have the same basic MRP calculations as the core of their production planning offering. Not surprisingly, a 2006 survey showed that users gave low marks to these high end ERP/SCM systems for performance in distribution and manufacturing (averaging 2.5 and 2.6, respectively, out of 4.0). In a survey performed by Microsoft of mid-sized companies (median revenue of $21 million, average around $100 million) 27% of 229 companies found their ERP/SCM system to be "ineffective" and 46% found it to be only "somewhat effective." Only 3% found the system used to be "very effective."

There are two basic problems with these systems: (1) order sizing is done without consideration of capacity and (2) planning lead times are assumed to be attributes of the part (see the book, Hopp and Spearman, *Factory Physics, Foundations of Manufacturing Management*, McGraw-Hill, New York, 2000, Chapter 5 for a complete discussion). The first issue results in conservative (i.e., large) order sizes which increase inventory and reduce responsiveness. The second issue is similar. Because the planning lead time does not depend on current work-in-process (WIP) levels and because being late (resulting in poor customer service) is worse than being early (resulting in extra inventory), most systems employ pessimistic (i.e., long) lead times. The result, again, is more inventory and less responsiveness and is especially aggravated when the bill of material is deep.

Efforts to address these problems have gone on for many years but the basic problems remain today. Consequently, most companies do not run their plants using the output of their ERP/SCM systems but, instead, "massage" the output using ad hoc spreadsheets.

Obviously, with this kind of "work around" there exists an opportunity to sell more sophisticated software and for some time now there have been numerous offerings known variously as "Advanced Planning and Scheduling" or "Advanced Planning and Optimization." These "APO" applications typically work between the Enterprise Resources Planning (ERP) system and the Manufacturing Execution System (MES). Although a typical ERP system contains many functions other functions, this application focuses on those concerned with supply chain management such as demand forecasting, customer order tracking, supplier management, inventory tracking, capacity planning, master production scheduling, material requirements planning, and the management of product data including bills of material and routings. The MES is where the plans from the ERP are realized within the manufacturing facility and typically includes functions such as work in process (WIP) tracking, shop order dispatching, product costing, and equipment tracking.

The APO is a more recent development that attempts to remedy some of the aforementioned problems found in ERP. However, APO's are in the form of some type of deterministic simulation of the process that assume the demand, inventory, work in process, run rates, setup times, etc. are all known which then seek to generate a schedule that is "optimal" under some specified criteria. FIG. 1 presents an exemplary supply chain that includes a fabrication operation whose output is used in an assembly operation as well as a distribution function. FIG. 2 presents a computational APO application operating with an ERP system and an MES. FIG. 3 illustrates the interrelations between these computational functions.

One of the earliest APO's to appear that was moderately successful is called "Factory Planner®" and has been offered by i2 Corporation under various names (e.g., Rhythm®) since 1988. Offerings by Oracle® and SAP® in relatively recent products are different only in style and, perhaps, in the level of integration with other data.

Moreover, there are at least three problems that prevent the use of deterministic simulation as being an effective supply chain planning and scheduling tool:

1. The supply chain and plant have inherent randomness that do not allow for the complete specification of a time for each shop order at each process center with given labor component. Such detailed schedules are often quickly out of date because of the intrinsic variability in the system. Moreover they do not manage risk which involves random events that may or may not happen. In the past, this has been addressed using ever more detailed models requiring ever more computer power. This misses the point. Variability and risk are facts of life and are the result of not only process variation (something that one attempts to control) but also unforeseen events and variability in demand (things that cannot be controlled). At any rate, the result is the same regardless of the variability source. Detailed scheduling can only provide a very short term solution and, in practice, the solution often becomes invalid between the time it is generated and the time that the schedule is distributed and reviewed as part of production planning meetings.

2. The detailed scheduling system must be re-run often because of the short term nature of the solution. This becomes cumbersome and time consuming. Moreover, without a method for determining whether a significant change has occurred, oftentimes the schedule is regenerated in response to random noise (e.g., a temporary lull in demand) which is then fed back into the system. Unfortunately, feeding back random noise results in an increase in the variability in the system being controlled. Because of these problems, many companies have turned off their Advanced Planning and Scheduling systems after spending a great deal of money to install them.

3. It is essentially impossible to find an optimal schedule. The problems addressed are mathematically characterized as "NP-hard," which means that no algorithm exists that works in "polynomial" time to solve scheduling problems. The practical result is that for realistic problems faced in modern factories and in the supply chain, there is not enough time to find an optimal schedule regardless of the speed of the computer. Consequently, heuristics must be applied to generate a, hopefully, near optimal schedule. The effectiveness of these heuristics is typically unknown for a broad range of applications.

These problems often result in a great deal of computer power being used to create a detailed schedule for a single instance that will never happen (i.e., the random "sample path" will never be what is predicted a priori) and that becomes obsolete as soon as something unanticipated occurs.

The most advanced systems today offer two methods of planning for manufacturing supply chains: (1) "what-if" analysis using a deterministic simulation of the supply chain and (2) "optimization" of a set of "penalties" (again, using a deterministic simulation) associated with inventory, on-time delivery, setups, and wasted capacity. There are also some crude methods for setting safety stock levels.

In addition to the fundamental problems listed above there are at two practical problems with this approach: (1) what-if analysis is tedious and (2) optimizing a penalty function is not intuitive.

The tediousness of what-if analysis comes from all the detail that must be considered. FIG. 4 shows the output of a typical APO prior art application for the scheduled production on six machines in one factory along with projected inventory plot of one of the items produced, discussed more below. The planner can move shop orders in the schedule and drill down on other items to view inventory projections. While this level of integration is impressive, it is not particularly useful especially when there are hundreds of machines (not to mention labor) to consider along with thousands of individual items, each with their own demand.

Likewise, the use of "penalties" to determine an "optimal" schedule is not intuitive. What should the penalty be for carrying additional inventory? What is the cost of a late order? What is the savings generated by reducing the number of setups, particularly if there is no reduction in head count? What is the cost of having idle machines?

FIG. 1 is a block diagram of a typical prior art supply chain that includes a fabrication operation whose output is used in an assembly operation as well as a distribution function. The important concept here is that the entire supply chain is comprised of only two types of components: stocks and flows.

Referring to FIG. 1, a simplified supply chain 1 includes Fabrication 2, Assembly 3, and Distribution 4. A plurality of raw materials come from a supplier 10 and are maintained in a Stock 11 until released into the product Flow 12 that may be embodied by one or more production processes. Once completed the product is either shipped immediately 14 (if the due date is passed) or is kept in a Stock 13 until the ship date (for make-to-order items) or until a demand occurs (for make-to-stock items). In this typical scenario some parts are shipped to an Assembly operation 3 and others directly to a Distribution center 4. In this example, the Assembly process brings together a plurality of parts from suppliers and fabrication, performs an assembly operation as well as other processes, and then either maintains an inventory in a Stock or ships to a Distribution site. The Distribution center comprising a Stock 15 and a kitting and shipping process 16 whereby the parts are shipped to satisfy Market Demand 17.

FIG. 2 is a block diagram of a typical prior art approach to supply chain management using an ERP system 50, an MES 54, and an APO system 52. Data for the ERP system is maintained in a data base 51 and includes all product information such as routings and bills of material as well as information regarding equipment and labor capacity along with demand information. Using data from the ERP system, the planner generates a plan for the period 53 which may be a week or more. The plan is then used to generate shop orders in the ERP system which is then executed using the Manufacturing Execution System 54, 58 and put into production 55. The MES also tracks WIP, cost, dispatch (i.e., prioritize) shop orders, track defects, etc. There may be scanners and sensors 56 that automatically collect data for WIP moving through the factory. There may also be computer monitors on the shop floor to indicate the status of the system 57.

FIG. 3 is a flow chart of a typical prior art approach to supply chain management using an ERP system. Long-term planning including the generation of a long term forecast 66, the capacity resource planning 70, together determine an aggregate production plan 68. Short-term planning brings in make-to-order (MTO) and make-to-stock (MTS) demands 72 as these occur into a Master Production Schedule 74. The planner may use the APO 88 to check capacity and due date feasibility of the schedule. Once a Master Production Schedule 74 is determined, Material Requirements Planning (MRP) 76 is used to generate demand for low level components. MRP data regarding the products and the system 84 includes bills of material to "explode" requirements for components based on the end product demand, inventory status data to determine net demand, lot sizing rules to determine the size of the shop orders, and planned lead times to determine when to launch purchase orders and shop orders. Once all of the demand for all of the components has been generated, netted, and lot sized, a pool of purchase orders and shop orders is generated as planned orders 78. The planner using the APO 88 then releases the shop orders at 80 to ensure on-time delivery and minimum inventory. This is typically done no more frequently than once per week. The Manufacturer's Execution System MES 86 tracks the shop orders as they go through production and provides information to the APO. These are released according to their release date if there is no APO. Alternatively, when an APO is present, it is used to determine an "optimal" release date that attempts to balance the conflicting desires of maintaining high utilization of resources while keeping inventories and cycle times low.

FIG. 4 is a representation of a prior art exemplary graphical user interface (GUI) 90 for an APO providing schedule and inventory information. This exemplary GUI presets a schedule for six machines 92 and numerous parts. One part 94 is highlighted and a plot of projected inventory is presented in the lower section of the GUI 96.

Accordingly, there is a need for an improved supply chain planning and scheduling tool that avoids one or more of the above drawbacks and limitations of the prior art.

SUMMARY OF THE INVENTION

The invention provides a systems and methods to generate effective schedules that minimize required inventory while providing acceptable on time delivery at the lowest possible cost (i.e., highest utilization of machines and labor). The systems and methods of the invention consider inherent randomness to be robust enough to accommodate moderate changes in demand and capacity without the need to reschedule.

The invention may be implemented in a number of ways. According to one aspect of the invention, a computer-implemented method for tracking production in a given product flow against demand associated with a plurality of orders in the flow is provided. The method includes the steps of determining a probability of shortage for the demand associated with at least one of the plurality of orders, determining expected inventory-days for at least one of the plurality of orders in the flow, and generating output showing the probability of shortage associated with at least one of the plurality of orders and the expected inventory-days for the at least one of the plurality of orders.

In another aspect, a computer-implemented method to signal insufficient or overabundance of capacity for a given flow operating under a given demand is provided. The method includes the steps of determining the total expected inventory-days and overall probability of shortage for a specified trigger, detecting when insufficient capacity is present and generating a first electronic signal based on the specified trigger, detecting when an overabundance of capacity is present and generating a second electronic signal based on the specified trigger, and altering capacity in a production process according to the first or second electronic signal.

In another aspect, a system for tracking production in a given product flow against demand associated with a plurality of orders in the flow is provided. The system includes means for determining a probability distribution of finish times for all orders in the flow, means for determining a probability distribution of associated demand time for at least one of the plurality of orders in the flow, means for determining the probability of shortage for the at least one associated demand based at least in part on both probability distributions, and means for displaying a graph showing the overall probability of shortage for the at least one associated demand versus a specified parameter.

In yet another aspect, a computer program product comprising a computer usable medium having readable program code embodied in the medium is provided. The computer program product includes at least one component to cause or perform execution of the following steps: determining a probability of shortage for the demand associated with each of the plurality of orders, determining expected inventory-days for each of the plurality of orders in the flow, and generating output showing the probability of shortage associated with at least one of the plurality of orders and the expected inventory-days for the at least one of the plurality of orders.

In an additional aspect, a system for applying a dynamic policy to a production control system is provided. The system includes a dynamic risk-based scheduling (DRS) system interoperably communicable with at least one of an enterprise resources planning (ERP) system, a manufacturing execution system (MES), and a generic manufacturing data base, wherein the DRS system includes: a optimal planning module that generates a dynamic policy comprising parameters for balancing inventory levels, utilization of equipment and labor, and on-time delivery, and the parameters used for generating an evolving schedule as changes in demand and production capacity arise, and an execution module that applies the dynamic policy to accommodate changes in demand or capacity without rescheduling.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and the various ways in which it may be practiced. In the drawings:

FIG. 15 is an equation showing the relation between demand (D), OOP cost (V), setup time (S), item cost (c), inventory carrying cost ratio (h) and ROQ (Q) and the LaGrange multipliers ($\lambda$), according to principles of the invention;

FIG. 19 is a representation of an exemplary graphical user interface (GUI) providing output showing the LaGrange multipliers for machine capacity, according to principles of the invention;

FIG. 22 is a representation of a graphical user interface (GUI) of the invention showing the output of an embodiment of the CONWIP Sequence execution process;

FIG. 23A is a representation of a graphical user interface (GUI) of the invention showing the output of an embodiment of the Production/Demand Tracking with a Capacity Trigger;

FIG. 23B is a pie chart output showing how much overtime is used, in accordance with FIG. 23A;

DETAILED DESCRIPTION OF THE INVENTION

Figure 1:
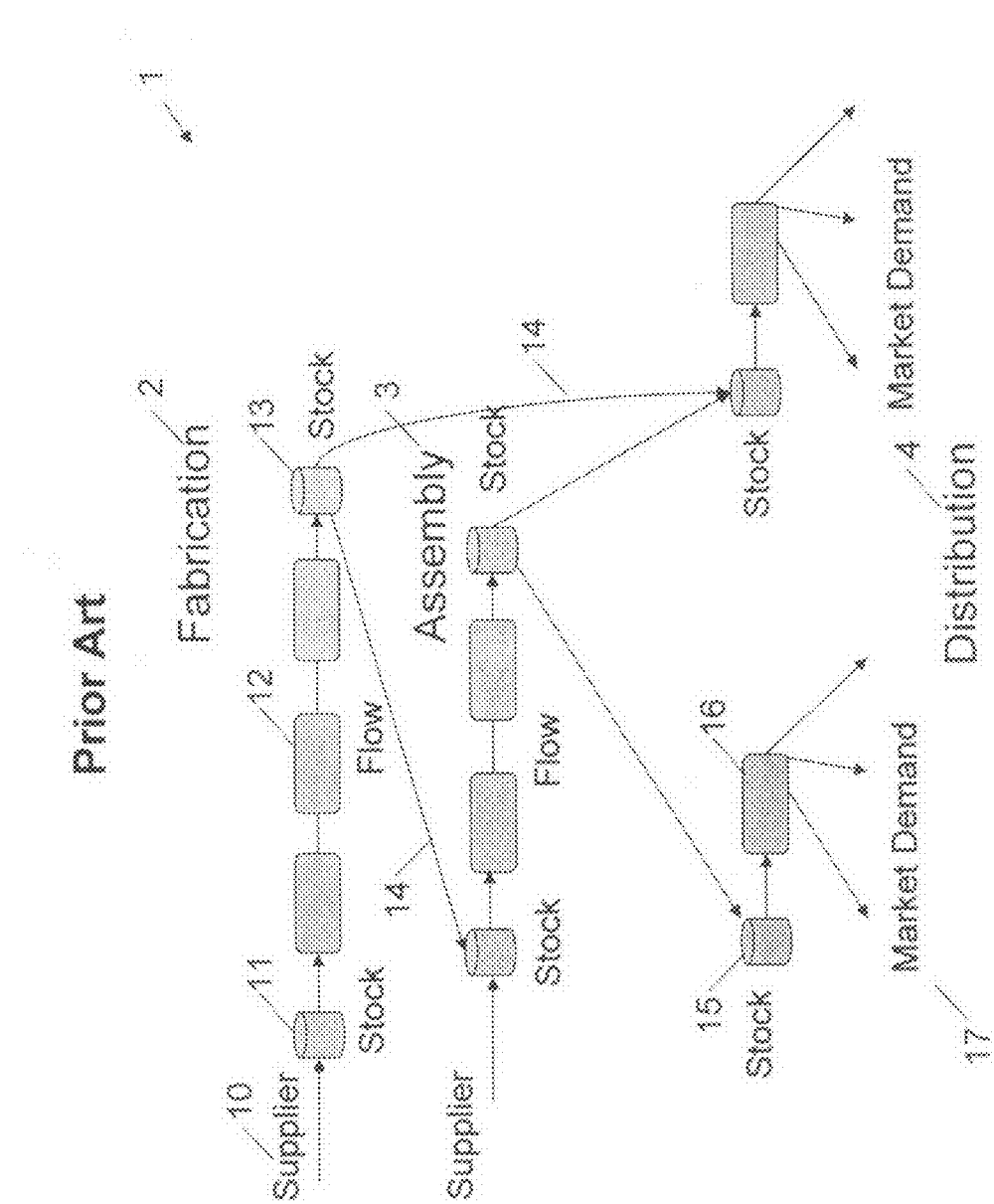
FIG. 1 is a block diagram of a typical prior art supply chain that includes a fabrication operation whose output is used in an assembly operation as well as a distribution function.

The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law. Moreover, it is noted that like reference numerals represent similar parts throughout the several views of the drawings.

It is understood that the invention is not limited to the particular methodology, protocols, devices, apparatus, materials, applications, etc., described herein, as these may vary. It is also to be understood that the terminology used herein is used for the purpose of describing particular embodiments only, and is not intended to limit the scope of the invention. It must be noted that as used herein and in the appended claims, the singular forms "a," "an," and "the" include plural reference unless the context clearly dictates otherwise.

Unless defined otherwise, all technical and scientific terms used herein have the same meanings as commonly understood by one of ordinary skill in the art to which this invention belongs. Preferred methods, devices, and materials are described, although any methods and materials similar or equivalent to those described herein can be used in the practice or testing of the invention.

The invention generally provides systems and methods for:
1. Optimal Planning that can balance the need for low inventory, low cost (i.e., high utilization of equipment and labor), and efficient on-time delivery. The result of such planning is not a schedule per se but a set of parameters that form a dynamic policy that generates an evolving schedule as conditions (demand, production) materialize.
2. Optimal Execution that applies the dynamic policy resulting in a manufacturing system that is robust enough to accommodate moderate changes in demand and/or capacity without the need to reschedule. Optimal Execution also involves the embodiment of a "Capacity Trigger" that detects when the assumptions regarding demand and capacity used to determine the dynamic policy are no longer valid. The Capacity Trigger provides a Trigger Signal to the planner indicating the need for either more or less capacity.

The Optimal Planning method of the invention may feature a method to optimize parameters used in commonly available Enterprise Resource Planning (ERP) systems (e.g., MRP parameters) and then use the optimized ERP system to generate the dynamic policy. A different embodiment would replace the production planning features of the ERP with features to generate the dynamic policy within the invention.

ERP parameters for optimization may include but are not limited to available machine and labor capacity, order quantities, maximum WIP levels, safety stocks, and planning lead times. In accordance with this inventive method, the optimal dynamic policy is determined that can respond to moderate changes in demand and capacity without the need to reschedule.

In one embodiment, a method seeks to determine a dynamic policy that minimizes total inventory in a Flow-Stock combination 100 (i.e., both WIP and finished stocks) subject to an established constraint for on-time delivery as well as constraints on capacity and the order quantities (e.g., minimum, maximum, and incremental constraints). In another embodiment, in addition to the above considerations, certain "out-of-pocket" expenses are considered that are associated with a setup (or changeover from one product to another).

Examples of out-of-pocket costs include material lost during a changeover and destruction of certain jigs and fixtures needed to facilitate the changeover, etc. Since the principles of the invention seek to provide an optimal policy for a given set of machine and labor capacities, time used by these resources is not considered an "out-of-pocket" expense. In an additional embodiment, in addition to all of the above considerations, raw material inventory carrying cost is included. Those skilled in the art will recognize that it is possible to include more and more elements of the supply chain until they are all considered, if desired.

The invention also provides a system and a computer program implementing the described methods herein, as well as output via a computer screen, file, or a printer.

Other aspects of the invention provide for optimal execution using the aforementioned dynamic policy. These aspects include (but are not limited to) one or more of the following:

1. A re-order point, re-order quantity (ROP,ROQ) system for make-to-stock items.
2. Generation of shop orders (including order sizing, and planned lead times (PLT)) for make-to-order demand.
3. A CONstant Work In Process (CONWIP) release methodology used for both make-to-stock and make-to-order items. As those skilled in the art would recognize, CONWIP is a generalized "pull" method that is useful to prevent "WIP explosions" and excessive cycle times.
4. A technique to sequence as opposed to schedule the shop orders. Sequencing specifies only the order of the shop orders to be maintained through the flow and, therefore, requires much less information than scheduling which requires start and stop times for every shop order at every process center. Moreover, it is much easier to sequence than to schedule. In an exemplary embodiment each flow would operate on shop orders of a specified size (the order quantity) and is sequenced according to a designated start date (SD). The sequence would be maintained as much as possible throughout the flow by requiring each process to always start the shop order in queue with the earliest start date.
5. A technique to track production against demand that is able to compute meaningful indicators that would signal conditions corresponding to late orders, a capacity shortfall, and an overabundance of capacity.
6. A "Capacity Trigger" indicating that either additional capacity is needed to prevent a decline in on-time delivery performance or that capacity should be reduced to prevent low productivity, high inventory, and increased cost.

Make-to-stock policies may be characterized by a re-order point (ROP) and a re-order quantity (ROQ) while make-to-order policies may be characterized by a planned lead time (PLT) and a lot size. Those skilled in the art will realize that the lot size for the make-to-order policy is essentially equivalent to the ROQ for the make-to-stock policy. These policies will henceforth be referred to as ROP, ROQ, PLT policies.

These techniques and procedures are used to (1) execute to an optimal plan so long as the assumptions for the plan are suitably accurate and (2) to detect conditions when the assumptions are no longer suitably accurate to warrant continuation in the plan.

The invention also provides a system and a computer program implementing the optimal execution processes and procedures.

Figure 6:
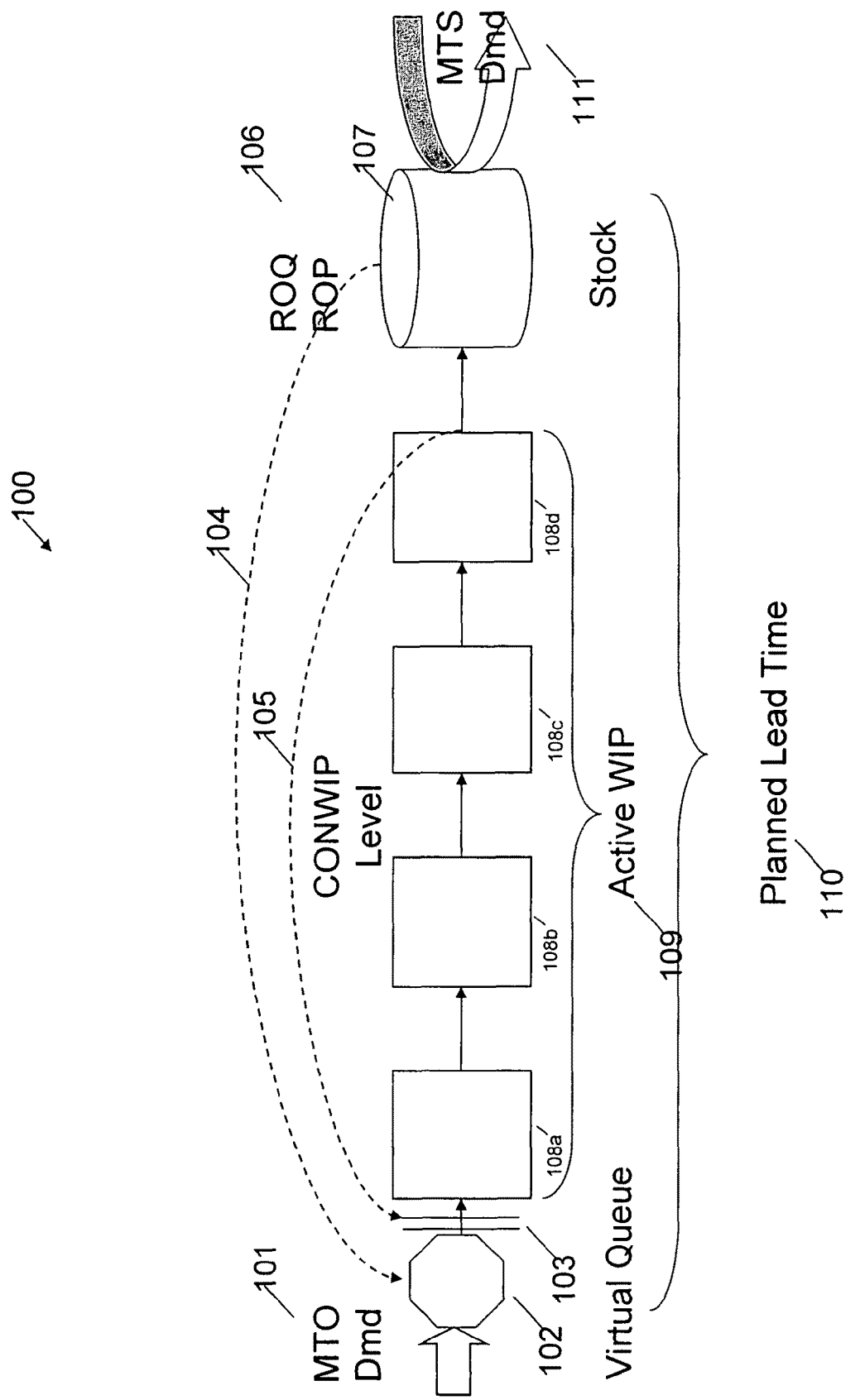
FIG. 6 is a functional flow diagram incorporating principles of the invention, showing detail of single Flow and single Stock that make up a larger supply chain.

FIG. 6 is a functional flow diagram incorporating principles of the invention, showing detail of single Flow and single Stock that make up a larger supply chain. The flow sequence of FIG. 6 may be used in conjunction with a supply chain, such as shown in FIG. 1. Make-to-order (MTO) demand 101 arrives from customers and is converted into shop orders and maintained in a Virtual Queue 102 until released into the Flow by the CONWIP release mechanism 103.

The CONWIP release mechanism allows new shop orders into the Flow whenever the Active work-in-process (WIP) level 109 falls below a specified level 105. Other embodiments might convert the Active WIP level 109 to some sort of standard units and maintain a CONWIP level accordingly. Shop orders may be processed in the flow at individual process centers 108a-108d. All of the WIP between the release point and the stock is called Active WIP 109. Make-to-stock demand 111 is satisfied directly from Stock 107 and is managed using an Inventory Policy 106 (e.g., a ROQ, ROP policy). In this exemplary embodiment, an order for Q parts is placed into the Virtual Queue whenever the inventory position reaches the re-order point, r 104. The Planned Lead Time 110 includes time in the Virtual Queue, in Active WIP and the planned time spent in Stock.

Figure 7:
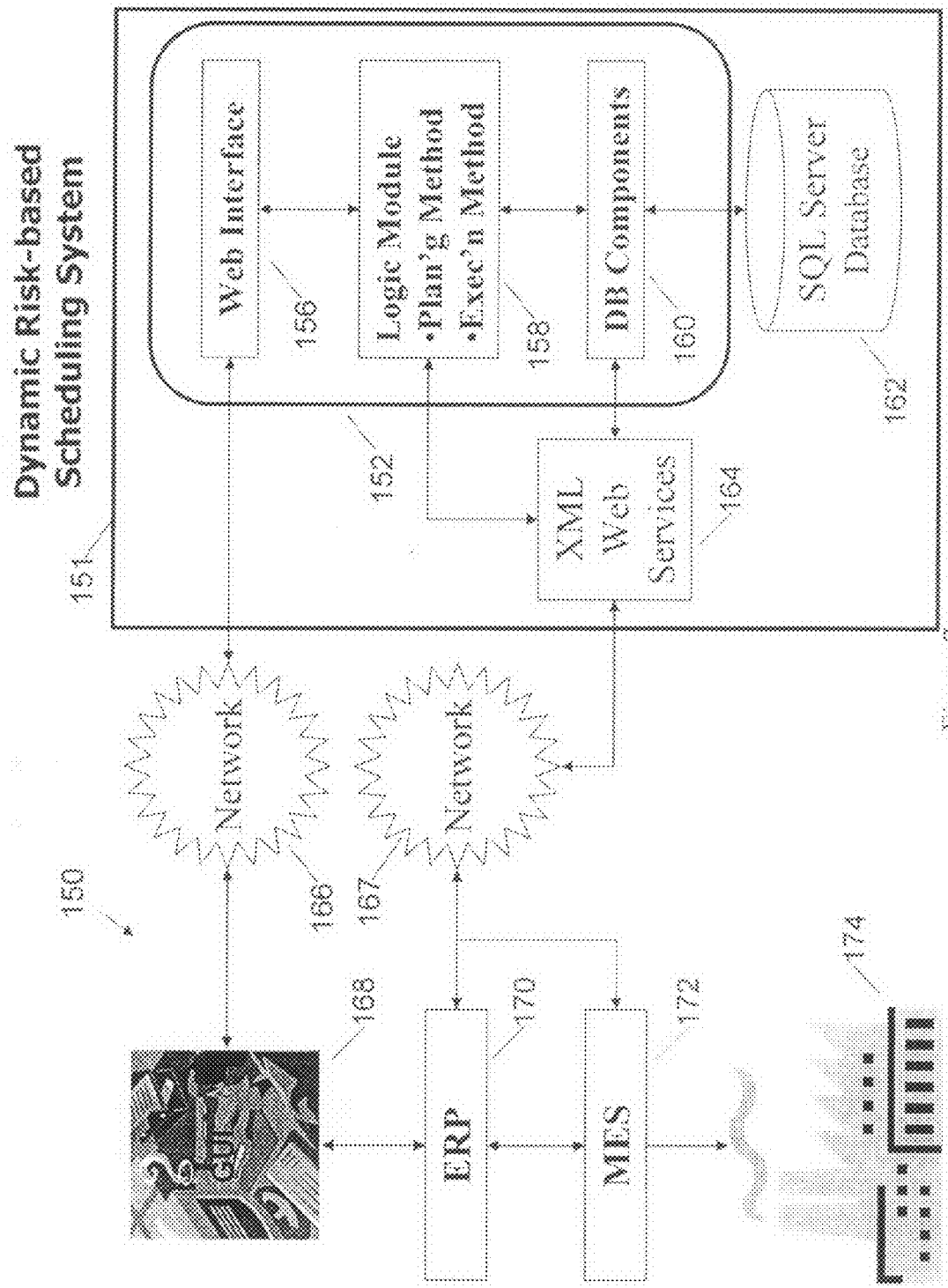
FIG. 7 is a block diagram illustrating an exemplary dynamic risk based scheduling (DRS) system in which the functionality of the invention may operate.

FIG. 7 is a block diagram illustrating an exemplary dynamic risk based scheduling (DRS) system in which the functionality of the invention may operate, generally denoted by reference numeral 150. The functionality provided by the invention may operate with or be embodied in other systems as well; FIG. 7 is just one exemplary version. The Dynamic Risk-based Scheduling (DRS) system 151 supplies the functionality according to the principles of the invention and may be implemented as one or more respective software modules operating on a suitable computer. The suitable computer typically comprises a processing unit, a system memory which might include both temporary random access memory and more permanent storage such as a disk drive, and a system bus that couples the processing unit to the various components of the computer. This computer is shown functioning as a server 152, but this is not a requirement.

Server 152 typically hosts three applications or "layers." These are (1) the data layer comprising database components 160 to access the data base 162, (2) the logic layer 158 comprising a high level language such as C, C++, or Visual Basic to implement the optimal Planning and Execution algorithms described more below, and (3) the web interface layer 156 comprising software components that allow the overall Dynamic Risk-based Scheduling functions to be accessed via a network 166. The network 166 could be a local intranet, wide-area network, or Internet. The connectivity may be accomplished by many different techniques including wired or wireless techniques commonly known in the art.

An exemplary embodiment of the invention may include XML and Web Services 164 to provide direct access by the DRS system 151 to data stored in the ERP system 170 and/or the Manufacturing Execution System (MES) 172 via an application programming interface over the network 167. (Networks 166 and 167 could also be a common network). A planner (e.g., a person using the DRS system) accesses the DRS system 151 via a graphical user interface (GUI) 168 operating over the network 166. The planner typically uses the same GUI 168 to implement the dynamic policy generated by the DRS in the ERP system 170. The ERP system 170 typically communicates with the MES 172 to provide direct controls to the manufacturing facility 174.

Figure 8:
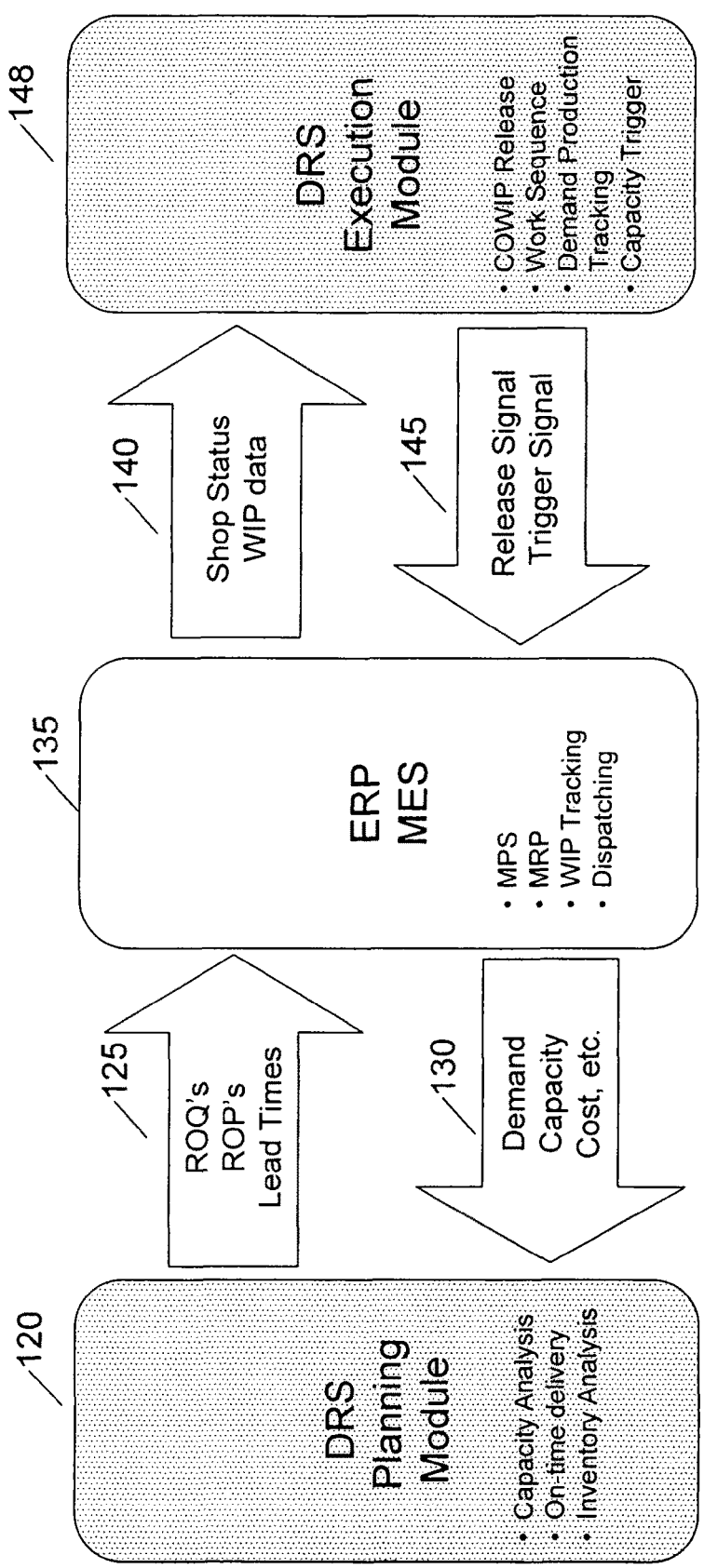
FIG. 8 is a block diagram illustrating the relationship of DRS operations in conjunction with an existing MES and ERP system, in accordance with principles of the invention.

FIG. 8 is a block diagram illustrating the relationship of DRS operations in conjunction with an existing MES and ERP system, in accordance with principles of the invention. The DRS comprises two logic modules, one for optimal Planning 120 and the other for optimal Execution 148. In this exemplary embodiment, the Planning Module 120 receives demand, capacity, cost, and other data, 130, from the ERP/ MES system 135 (typically from ERP) and returns optimal parameters of capacity, including any of ROP's, ROQ's, and PLT's, 125, to the ERP/MES system 135 (typically to the ERP). The ERP/MES system 135 provides a release pool of shop orders (i.e., information of one or more shop orders) while the MES provides shop status and WIP location information 140 to the DRS Execution Module 148. The DRS Execution Module 148 provides a release signal based on the CONWIP protocol (and/or including based on the optimal parameters), and a trigger signal 145 to the MES.

Figure 2:
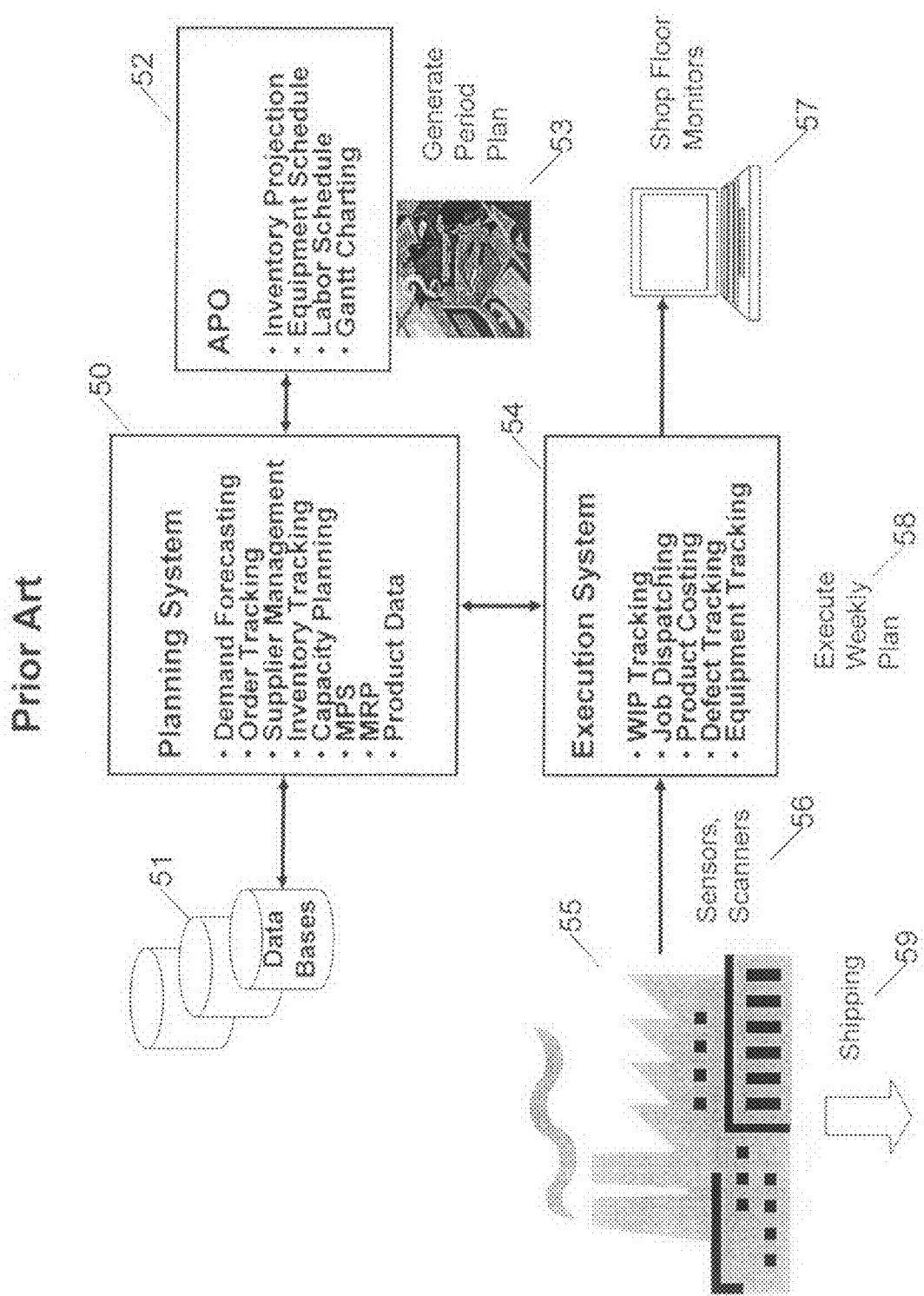
FIG. 2 is a block diagram of a typical prior art approach to supply chain management using an ERP system, an MES, and an APO system.
Figure 9:
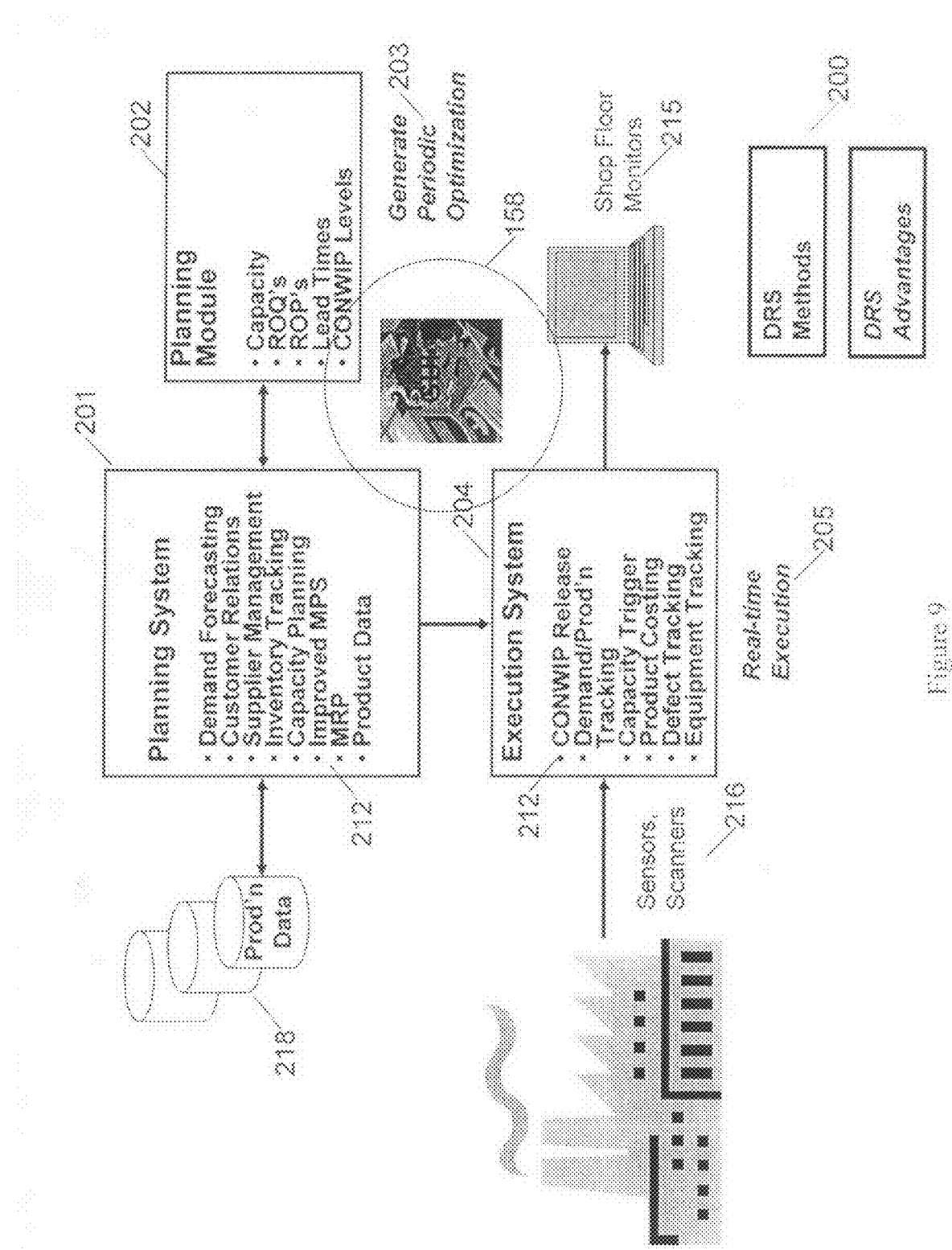
FIG. 9 is a block diagram of a DRS based system operating with planning and execution systems and showing several advantages over existing supply chain management systems, according to principles of the invention.

FIG. 9 is a block diagram of a DRS based system that is similar to FIG. 8 and which shows several advantages over existing supply chain management systems, according to principles of the invention. The APO module of prior art systems (such as APO 52 of FIG. 2) is now replaceable with the optimal Planning Module 202 that includes algorithms to optimize parameters used in the planning system 201 including but not limited to capacity, ROP's, ROQs, and PLT's. These updated parameters are then stored in the data bases 218. The Planning Module 202 also provides the dynamic policy parameters including but not limited to CONWIP levels for the Execution Module 212. In contrast to the embodiment of FIG. 8 where the DRS comprises a separate Execution Module 148, the execution features of the DRS are now integrated into an existing Execution System 212.

With the Planning Module 202, the planner is now enabled to perform a periodic (e.g., monthly) optimization 203 that feeds the results into what becomes an improved planning and execution system 201/204. This eliminates any need to perform a detailed schedule by replacing such a detailed schedule with a dynamic policy operating along with the ERP/MES framework and within a CONWIP generalized pull production environment. The dynamic policy comprises a set of optimized ERP parameters that operate with traditional MRP (i.e., time-phased re-order points) to generate both make-to-order and make-to-stock demands for all levels in the bill of material. As a result, one difference between traditional MRP and the new principles provided by the DRS system is that the shop orders are not released into production via a schedule (per traditional MRP), but rather, are now pulled in according to the CONWIP protocol, according to the principles of the invention. This prevents the inevitable "WIP explosions" that are experienced by most MRP systems while maintaining the ERP planning and execution hierarchy.

The Execution Module 212 may be utilized via the GUI 168. Although the Execution Module 212 functions as though it were embodied in both the ERP System and the MES (as is depicted here), it may be a logical component of the DRS 151 itself and typically resides on the DRS server 152. Thus the ERP system 201 differs from the original ERP system 50 in that the original Master Production Scheduling application 74 has been replaced by an Improved MPS that is provided by the Execution Module 212. The enhanced MES 204 has replaced the traditional WIP tracking and Dispatching components, such as FIG. 2, MES 54, with a CONWIP Release function, a Demand to Production Tracking function, and a Capacity Trigger function that are supplied as part of the Execution Module 212. The planner may use the GUI 158, described more below, to interact with both the Planning Module and the Execution Module in order to set parameters for these functions, to review the output, and, finally, to implement the dynamic policy.

Inputs to the enhanced MES functions come from sensors and scanners 216 on the shop floor or from direct data entry. Outputs go to shop floor monitors 215 or may be printed out for manual distribution. The advantages of the system and methods of the invention include periodic optimization of the parameters used for planning 203 and real-time execution of a dynamic schedule 205, as opposed to periodic regeneration of a fixed schedule commonly used by prior art systems.

Figure 3:
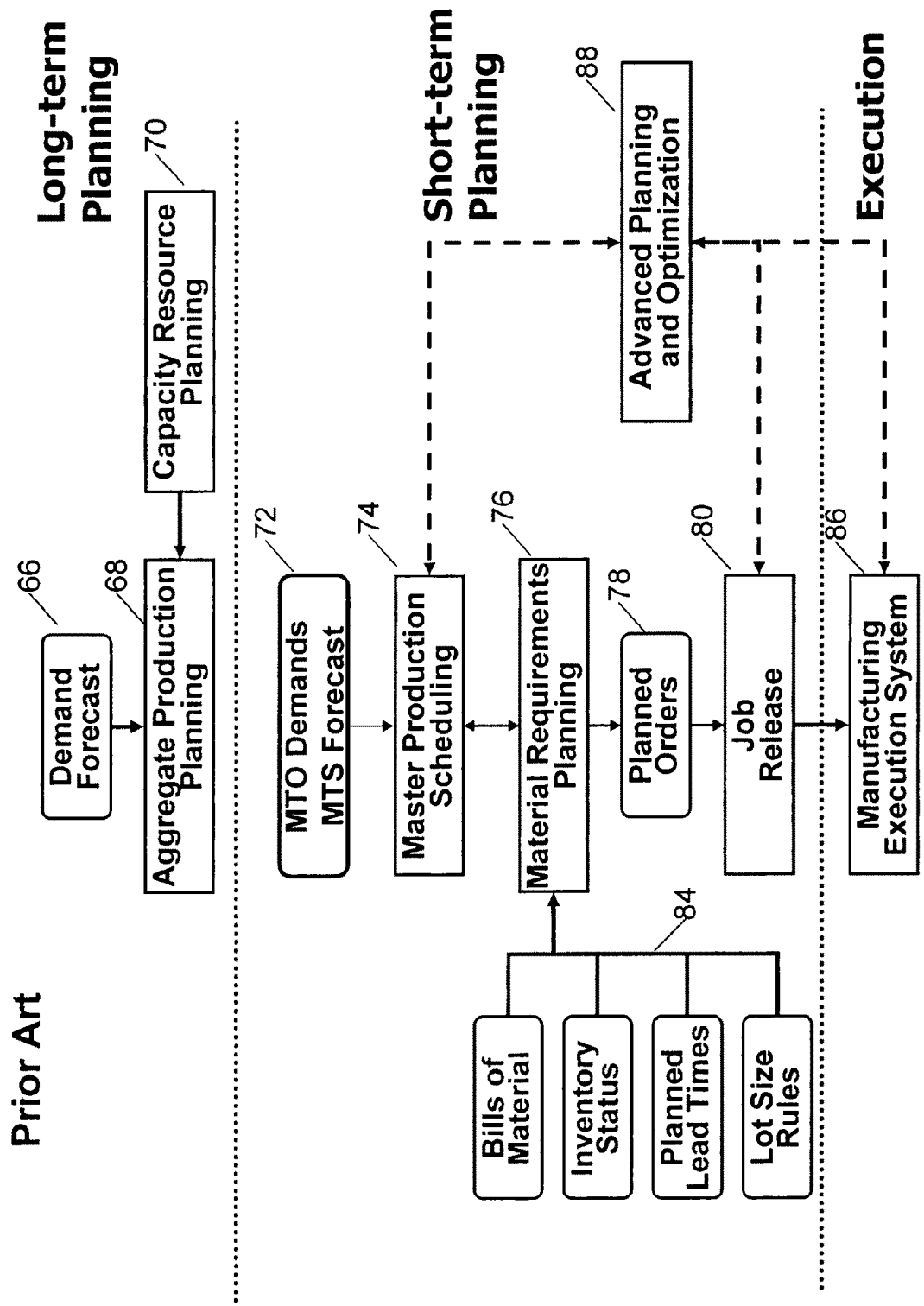
FIG. 3 is a block diagram of a typical prior art approach to supply chain management using an ERP system.
Figure 4:
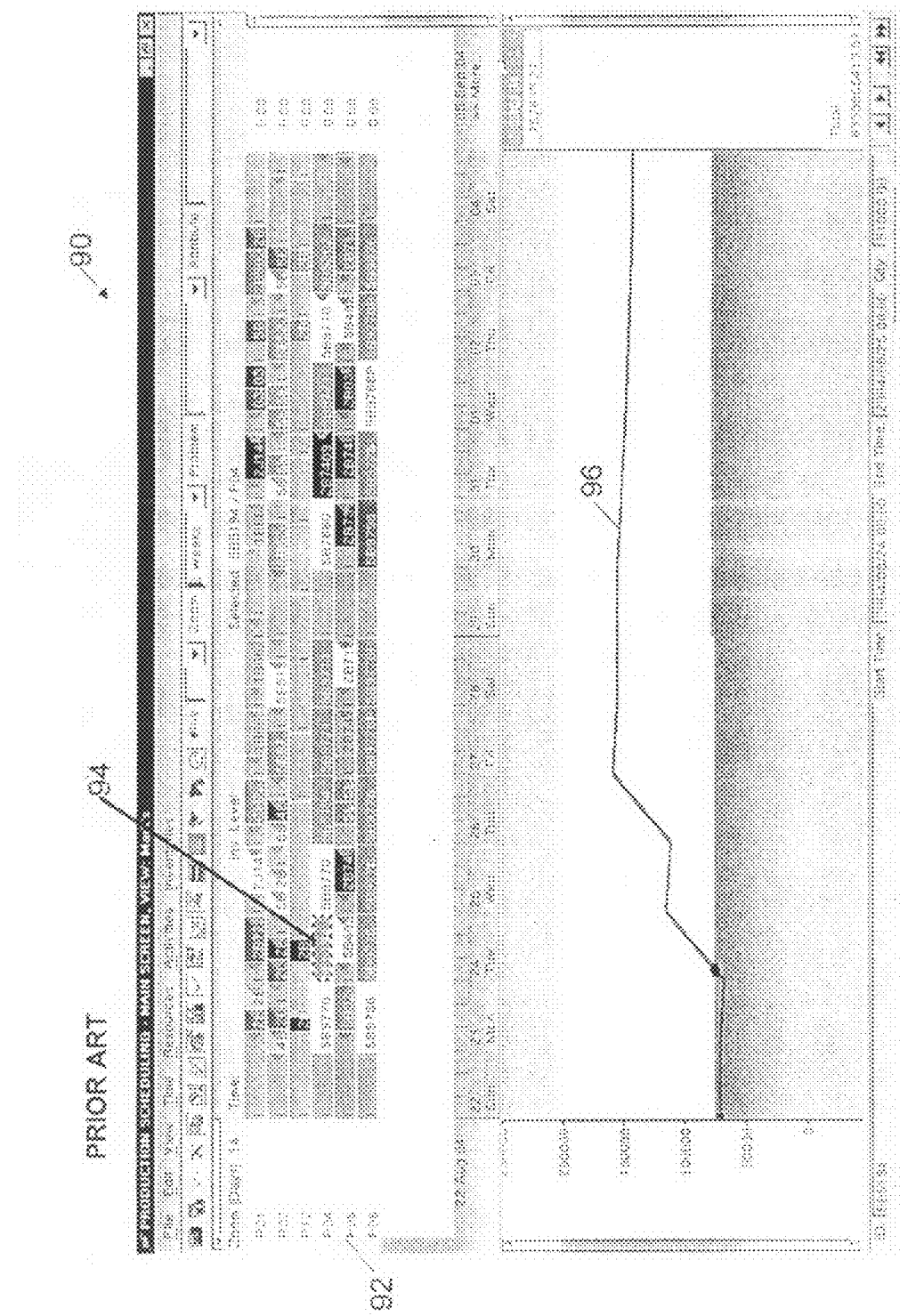
FIG. 4 is a representation of a prior art graphical user interface (GUI) of an Advanced Planning and Optimization system (APO)
Figure 5:
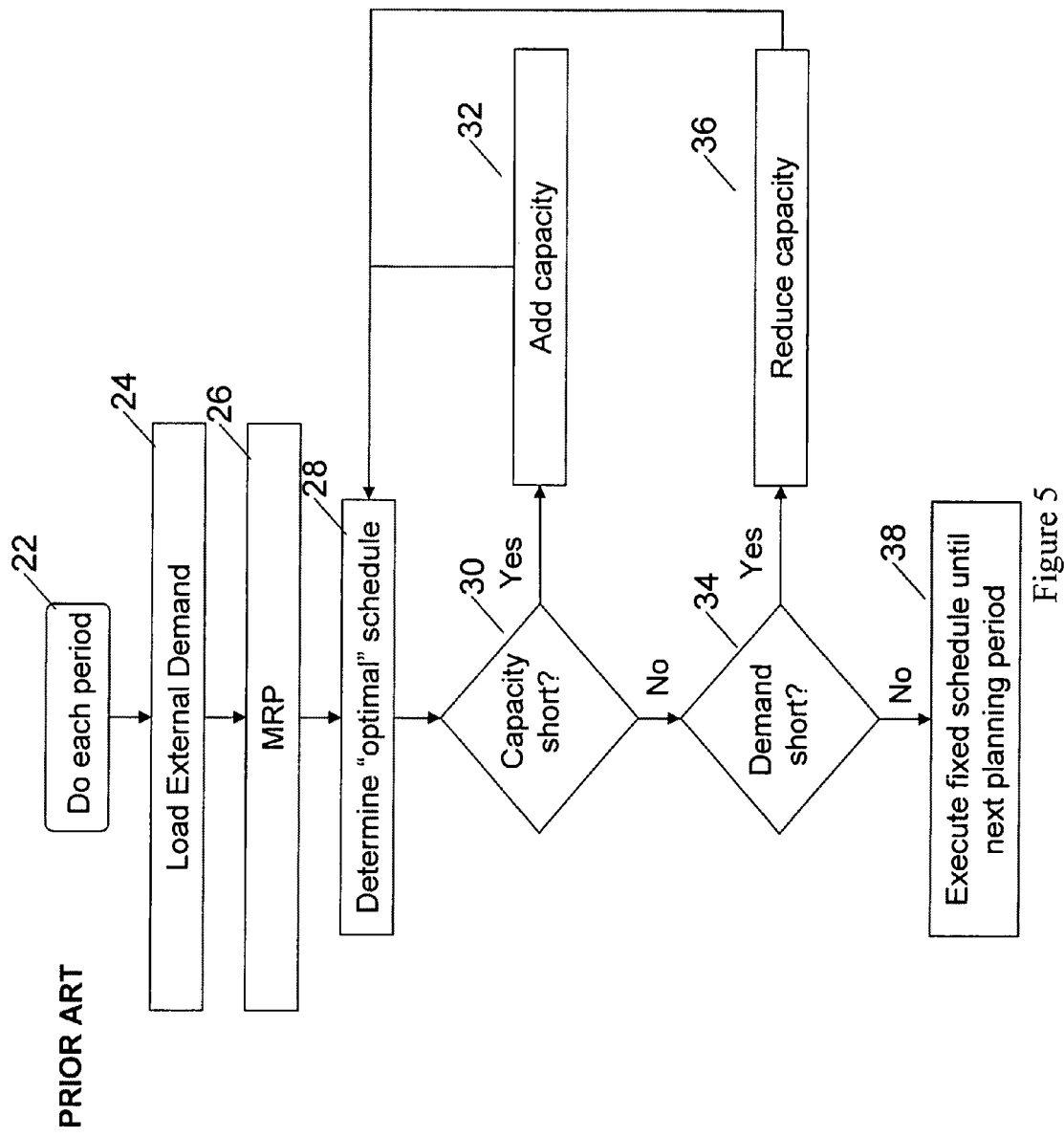
FIG. 5 is a flow chart of a typical prior art approach to supply chain management using an ERP system equipped with an APO.
Figure 10:
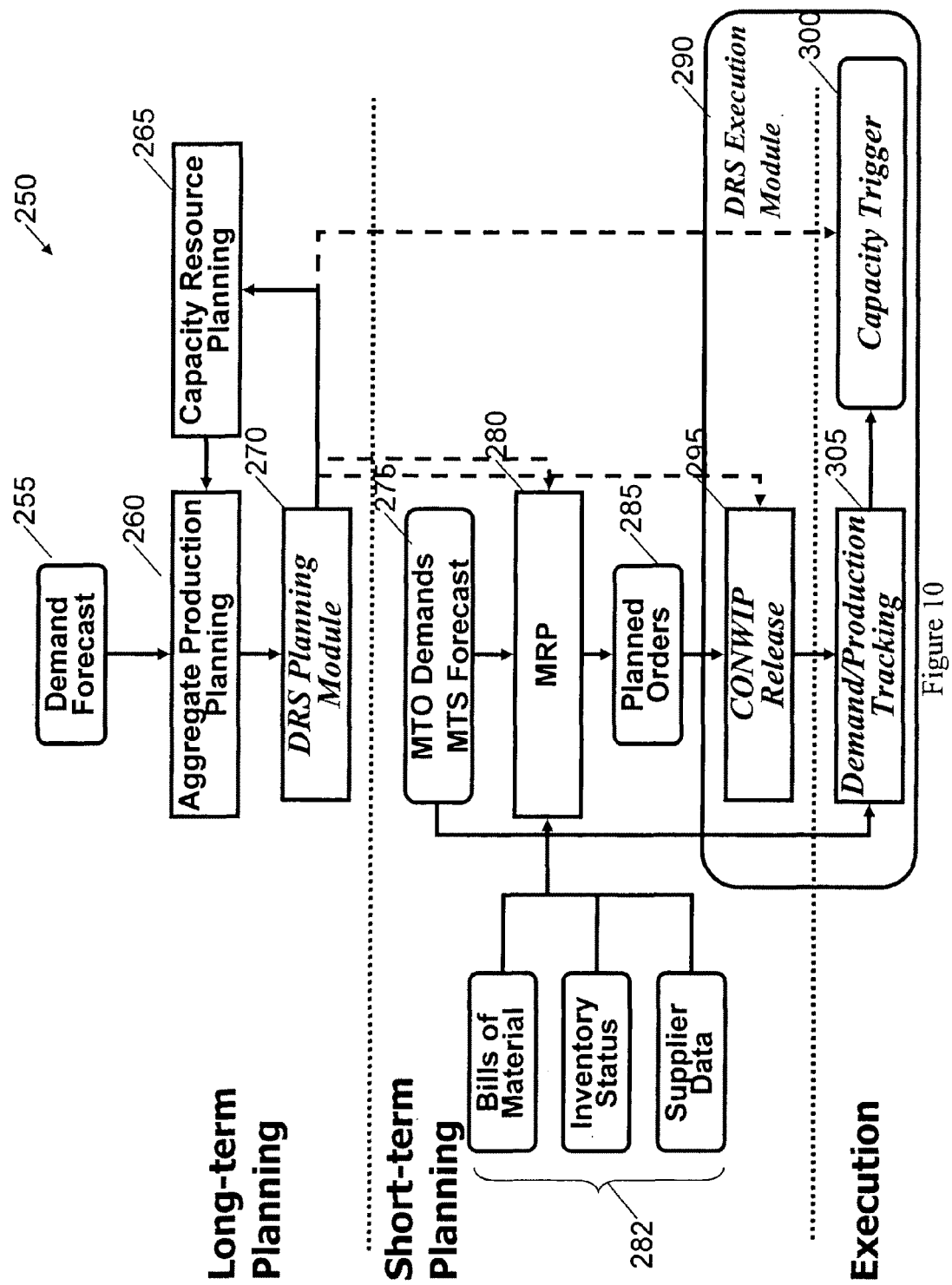
FIG. 10 is a flow diagram of an embodiment of a system of the invention involving an ERP system.

FIG. 10 is a flow diagram of an embodiment of a system involving an MES and ERP system, according to principles of the invention, generally denoted by reference numeral 250. The process steps of Demand Forecast 255, Aggregate Production Planning 260, and Capacity Resource Planning 265 features remain as part of the overall process, as traditionally known. However, an optimal DRS Planning Module 270, functioning according to principles of the invention explained in more detail is now also used during the overall planning and execution process. This greatly enhances the ability to balance the need for on-time delivery, minimal inventory, and high utilization of equipment and labor. Output from the DRS Planning Module 270 (designated by dashed flow lines) is used by the MRP system 280 (ROQs, ROP's, PLT's), the CONWIP Release module 295 (CONWIP levels) and by the Capacity Trigger 300 (e.g., maximum probability of shortage). In traditional ERP, MTO demand and MTS forecasts 275 typically go into the MPS module (e.g., 74 of FIG. 3). In the case of a DRS enhanced ERP system, these demands go directly into the gross requirements of the MRP module 280 and may be re-sequenced using the Demand/Production Tracking module 305. This eliminates a great deal of manual rescheduling while the functionality of the MES is moved to the Execution Module 290, particularly by the Demand/Production Tracking Module 305 that has much greater ability to model stochastic events. The MRP module 280 uses MTO demand and MTS forecast along with inventory data 282 to generate a set of planned orders. Purchase orders are released to suppliers on their planned start date. However, shop orders are released to the floor according to the CONWIP Release functions 295. The progress of shop orders is tracked using the Demand/Production Tracking module 305. If multiple shop orders appear likely to miss due dates, the Capacity Trigger 300 issues a Trigger Signal.

Figure 11:
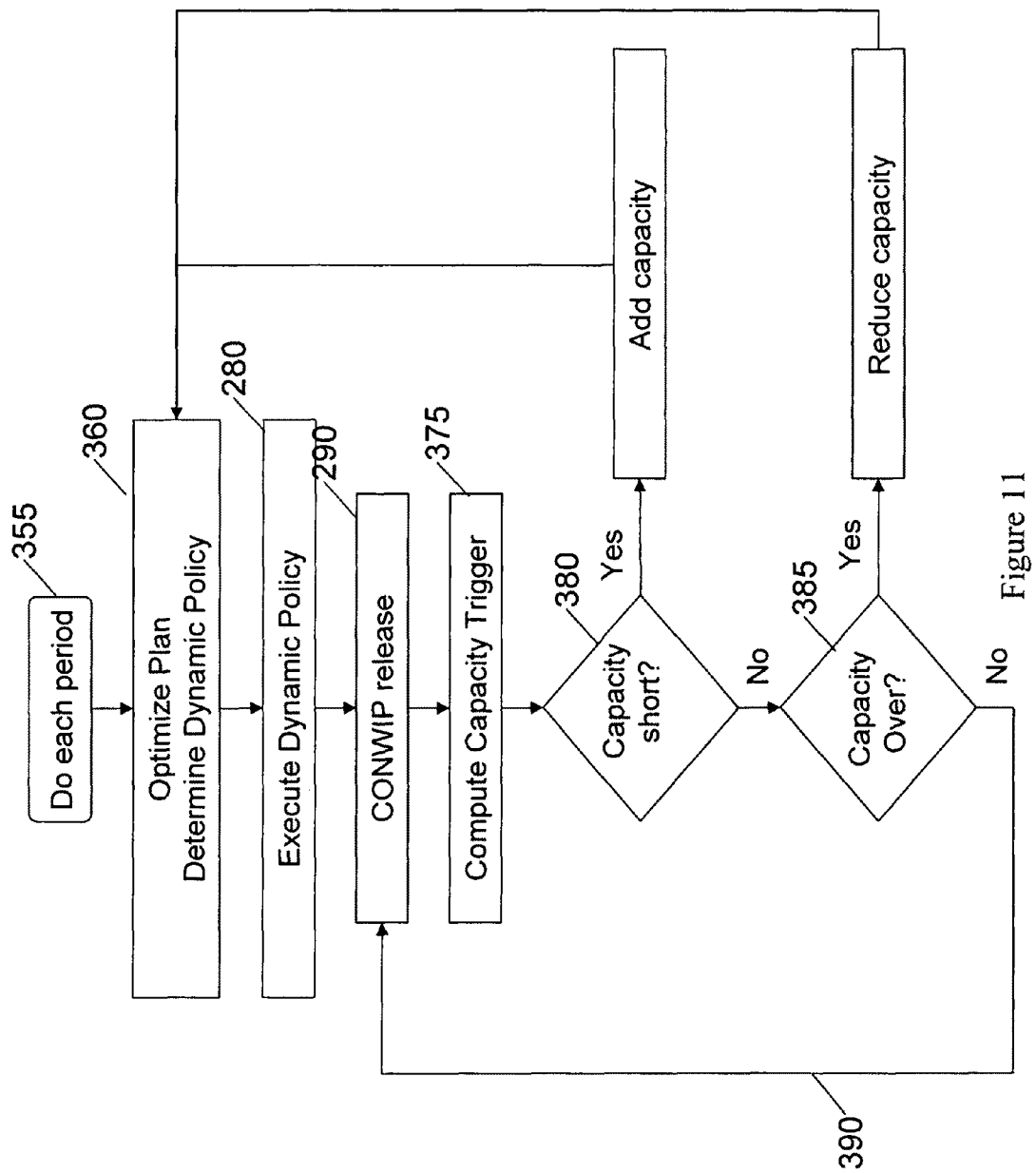
FIG. 11 is a flow diagram of an embodiment of DRS used for planning and execution independently of an ERP system, according to principles of the invention.

FIG. 11 is a flow diagram of an embodiment of DRS used for planning and execution independently of an ERP system, according to principles of the invention. FIG. 11, and all other flow diagrams and steps herein, may equally represent a high-level block diagram of components of the invention implementing the steps thereof. The steps of FIG. 11 (and other flow diagrams herein) may be implemented on computer program code in combination with the appropriate hardware having a processor(s) for execution of the computer program code. This computer program code may be stored on storage media such as a diskette, hard disk, CD-ROM, DVD-ROM or tape, as well as a memory storage device or collection of memory storage devices such as read-only memory (ROM) or random access memory (RAM). Additionally, the computer program code can be transferred to a workstation over the Internet or some other type of network, perhaps embedded in a carrier wave to be extracted for execution. The steps of the flow diagrams herein may be implemented on the systems of FIGS. 7 and/or 9, for example, or other systems known in the art, Continuing now with FIG. 11 at step 355, before (or at the start of) each planning period (e.g., monthly or quarterly), the dynamic policy may be optimized, step 360. This optimization includes but is not limited to setting capacity levels for machines and labor, ROP's, ROQ's, PLT's for parts, and CONWIP levels for flows. After acquiring a good set of dynamic policy parameter(s), the system executes autonomously using the Dynamic Policy, step 280, and CONWIP Release, step 290, until either (1) the end of the planning period is reached or (2) the occurrence of a capacity trigger. If capacity is short, a signal to add capacity is generated, step 380. If demand is less than available capacity for a long enough time, the Virtual Queue 102 will either empty or become very low. At step 385, either of these conditions (empty or very low Virtual Queue) is an indicator that capacity is "over" 385, and a signal (i.e., an electronically generated signal) to reduce capacity may be generated.

Capacity can be added in many ways including but not limited to working overtime, adding a shift, working on a weekend day, or increasing head count. Capacity can be reduced by reversing these processes as in eliminating overtime, taking away a shift, ending work on weekends, and decreasing headcount. The DRS processes and procedures seek to provide the right amount of capacity for the realized demand without excess cost (e.g., overtime rates) while maintaining on-time delivery and minimal inventories. If capacity does not need to be adjusted the process continues 390 until the end of the period.

Figures 12A, 12B:
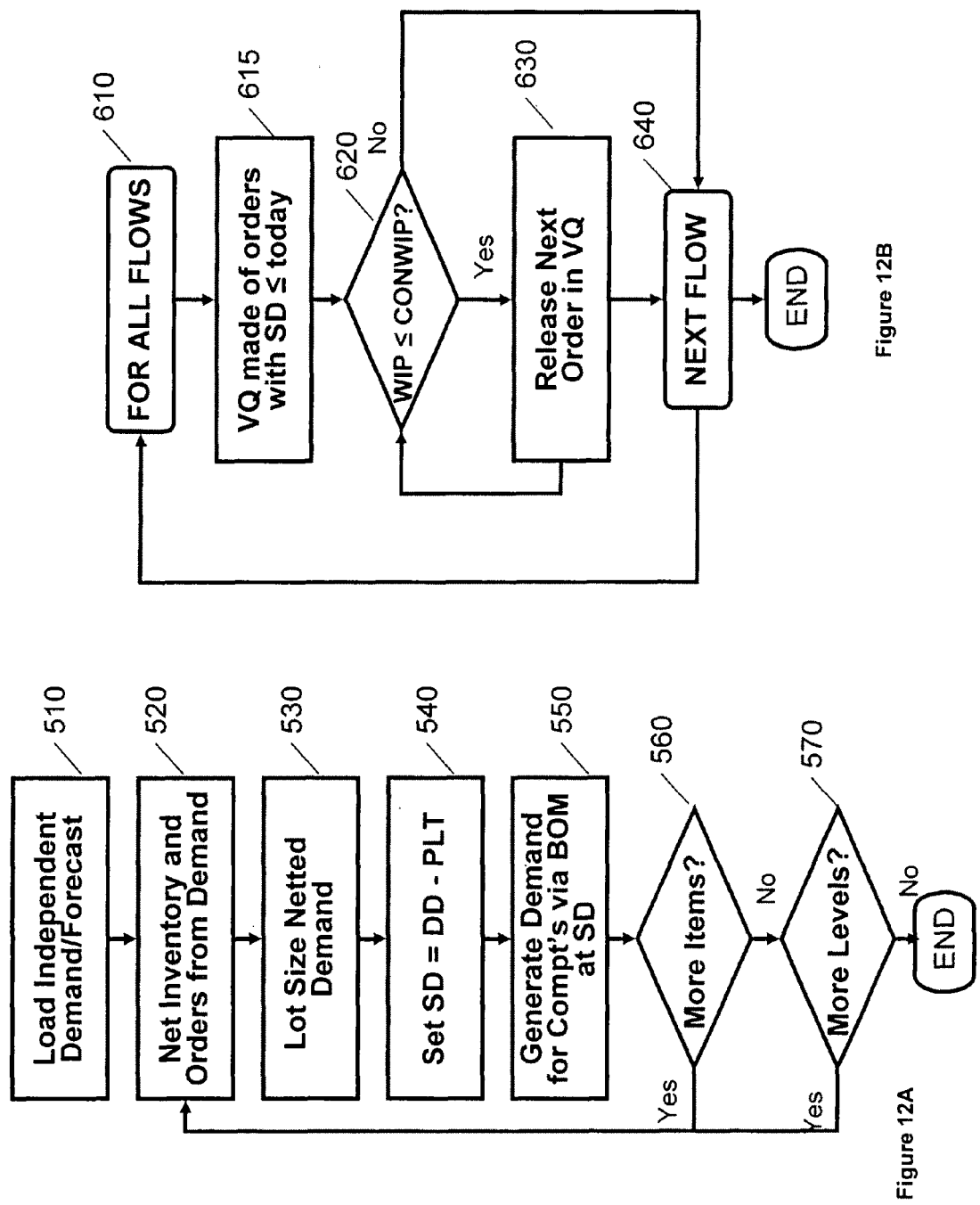
FIGS. 12A and 12B are flow diagrams of an embodiment of the Dynamic Policy and CONWIP, according to principles of the invention.

FIGS. 12A and 12B are flow diagrams of an embodiment of the Dynamic Policy and CONWIP, according to principles of the invention. The Dynamic Policy is similar to classic MRP and begins with the loading of the realized independent (i.e., outside) demand for all make-to-order items and an independent demand forecast for all make-to-stock items 510 (both are hereinafter referred to as "demand"). At step 510, independent demand orders and/or forecast are loaded. At step 520, these demands are netted against available inventory and any pre-existing orders. At step 530, the netted demands are then divided and/or collected into orders (both shop and purchase) using the optimized order quantities (ROQ). At step 540, a Start Date (SD) is computed for all items by subtracting the Planned Lead Time (PLT) from the Due Date (DD) of the order. At step 550, the combination of the sku, SD, and ROQ may be used with the Bill of Material (BOM) to generate demand for component parts. At step 560, a check is made whether there are more parts in the given Low Level Code. If so, then the process continues at step 520.

The entire logic is repeated until no more Levels are present step 570. The output is typically a collection of one or more purchase orders and/or one or more shop orders. The purchase orders may be sent to the suppliers on their SD.

Shop orders whose start date (SD) is before "today" go into the virtual queue (VQ) 615. These shop orders are released into the flow using the CONWIP technique in which the process considers all flows in the manufacturing facility 610. At step 620, a check is made to see if the WIP in a given flow is below the established CONWIP. If so, at step 630 the next shop order in the Virtual Queue may be released. Shop orders in the Virtual Queue are typically arranged in earliest startdate order. This is repeated for all flows, step 640.

Figure 13:
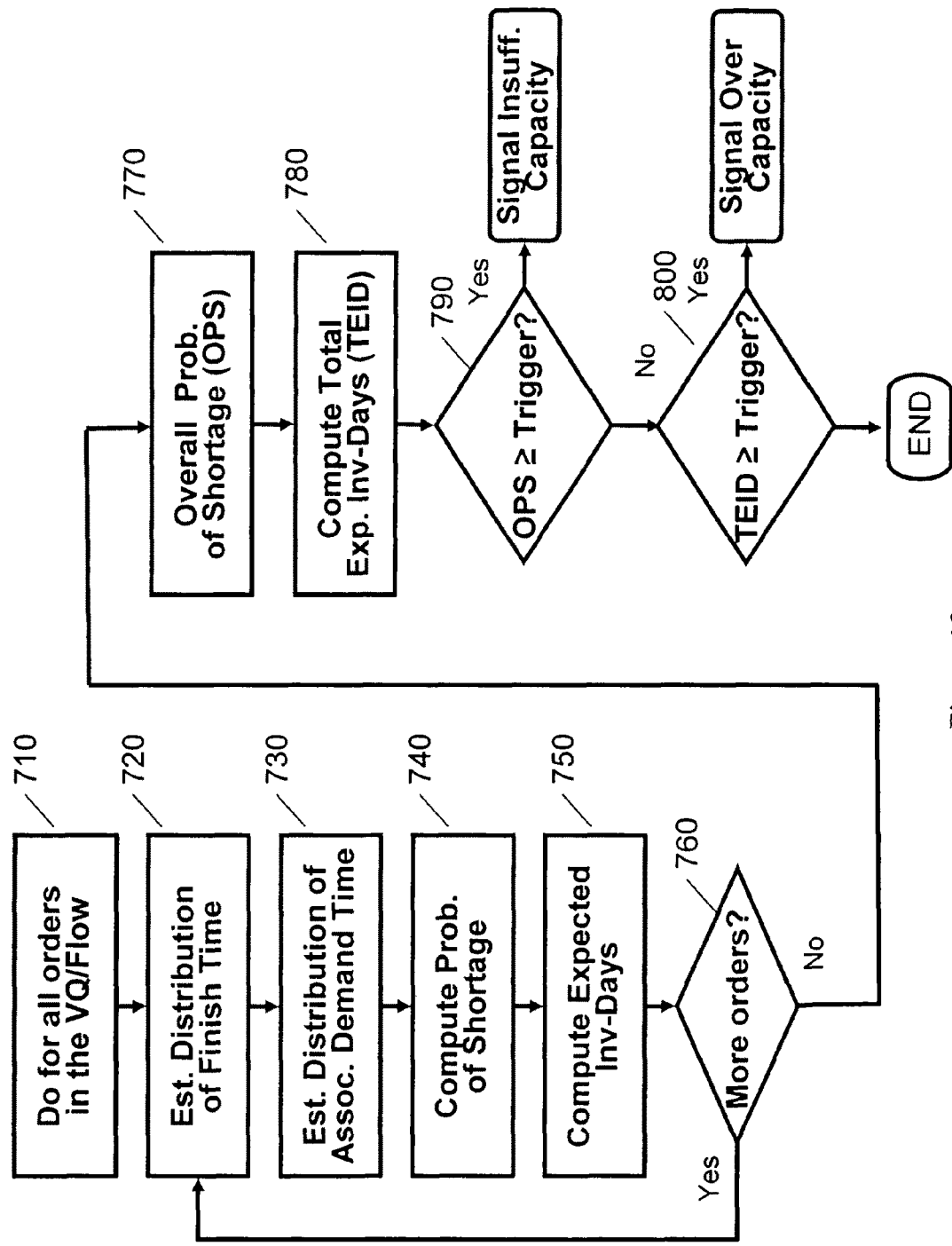
FIG. 13 is a flow diagram of an embodiment of the Demand/Production Tracking (DPT) module of FIG. 10, according to principles of the invention.

FIG. 13 is a flow diagram of an embodiment of the Demand/Production Tracking (DPT) module of FIG. 10, according to principles of the invention. The DPT module provides a graphical means to determine whether the product flow is ahead of demand, behind demand, or is synchronized with demand. The exemplary process begins at step 710 by considering all of the orders in the VQ. At step 720, for each order, a statistical distribution of the finish time is estimated either by Monte-Carlo simulation or by using a stochastic model. The orders may be prioritized by start date and may utilize a plurality of routings. Those skilled in the art should understand and be able to make multiple transient Monte-Carlo simulations, each using a different random number seed, and each starting with the current configuration to provide a statistical sample of finish times. This sample of times can be used to estimate a sample distribution using any of a number of statistical techniques. An exemplary technique includes estimating the cumulative distribution probability for the $i^{th}$ "order statistic" from a sample of size n given by, $$F(t_i) = \frac{i}{n+1}$$

At step 730, an estimation of the next associated demand time may be determined. The different orders are associated with the demands in the order of their sequence as determined by their start date. Normally, the order with the earliest SD is associated with the first demand instance, and so on. If demand instances are not of the same size as the orders, care must be taken to associate each demand instance with the proper order. Typically, demand associated with MTO has a degenerate distribution associated with the time of its demand in that all the probability is assigned to a single point in time. In either case, at step 740, computation of the probability of shortage (i.e., late) may be computed. At step 750, the expected amount of inventory (i.e., inventory-days) that would accumulate before the demand date may be computed. At step 760, a check is made whether there are more orders. If so, the process continues at step 720. If, however, there are no more orders, the process continues at step 770, where with this information, an "overall probability of shortage" (OPS) maybe computed. At step 780, a total expected inventory-days (TEID) may be computed. One measure (of many) of OPS may be the expected number of items to be delivered on time divided by the total demand. Another exemplary measure may be the expected number of orders delivered entirely on time divided by the total number of orders. Other measures may be used as deemed suitable. At step 790, if the OPS measure is greater than a specified Trigger, a Trigger Signal indicating insufficient capacity may be issued. At step 800, if the TEID is greater than a different specified Trigger, a Signal indicating a possible overabundance of capacity may be issued.

The Capacity Trigger typically works in two ways. One signal is that there is insufficient capacity and so more is needed. Exemplary techniques to add more capacity include but are not limited to adding overtime, adding an extra shift (or hours), or adding more people to the labor force. For supply chains operating all available machines 24 hours per day, 7 days per week, no additional capacity is available and so the Capacity Trigger is an indication to reduce the amount of demand that is accepted by the facility. The other way the Capacity Trigger works is to indicate when there is an overabundance of capacity. In this case, there is more capacity than needed to meet demand and so the utilization of the machines and labor will be lower than desired. Since the cost of labor and machines is now distributed over fewer parts, unit costs rise. Consequently, the Capacity Trigger indicates the need to reduce capacity (at least labor, usually) in order to reduce costs.

In other embodiments, as relating to step 790, the probability of late shop orders may be computed continuously. Whenever the probability exceeds a set level, additional capacity is needed and a signal is generated. Other, somewhat simpler embodiments may also be employed such as whenever the amount of work in the Virtual Queue exceeds a given level, a signal for more capacity is generated.

Note that the way work is generated for the Virtual Queue, both by the receipt of an outside order (such as 101, FIG. 6) and via consumption of stock and the employment of an inventory policy (such as 106, FIG. 6), there is a limit to how far the flow can progress ahead of demand. If there are no new outside orders and if all the stocks are above their re-order points, there will be no demand in the Virtual Queue. Thus, the simplest indicator of an overabundance of capacity is a Virtual Queue that is either empty, or has very little work. The computation of Total Expected Inventory Days provides additional information indicating how much extra inventory might be caused by orders finishing early.

Figure 14:
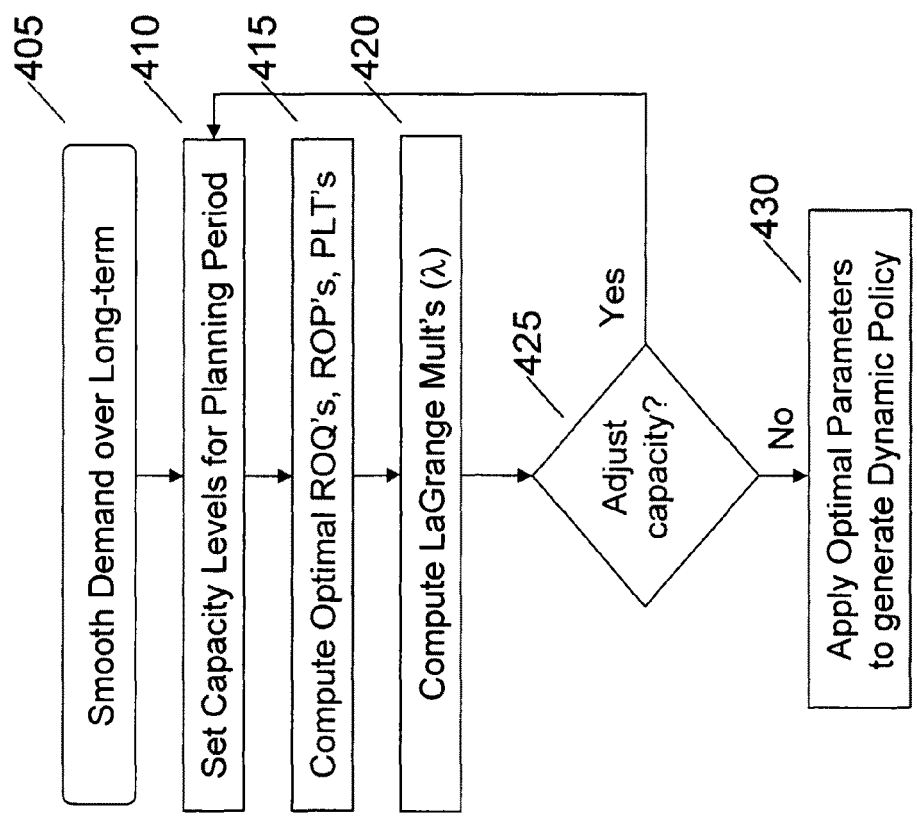
FIG. 14 is a flow diagram describing an embodiment of the Optimization Module, according to principles of the invention.

FIG. 14 is a flow diagram describing an embodiment of the Optimization Module, according to principles of the invention. At step 405, the Optimization begins with a smoothing of demand over the long-term. In alternate embodiments, such smoothing could be part of another module in the ERP system such as the Aggregate Production Planning module. Nonetheless, the decision is made whether to employ a "chase" strategy by adding and subtracting capacity for peaks and valleys in demand, or whether to smooth demand by "pulling in" demand "spikes" from the future and by "pushing out" high demand early on. A chase strategy is typically more costly from a capacity view because of numerous capacity changes. On the other hand, pulling in demand creates additional inventory while pushing out high demand may result in late shop orders. Nonetheless, at step 410, because a dynamic policy can be established now with static parameters, it is possible to establish a relatively constant level of capacity for the operation. This level might be adjusted during the optimization procedure but it typically remains static for the planning period. This is typically not a problem since most production facilities adjust basic capacity relatively rarely (e.g., once per month, or some other time period).

At step 415, the optimal ROQs and ROP's for the given capacity levels (both machine and labor) may be computed. In some modes of the optimization, the objective may include minimizing the sum of the WIP and finished stock inventory carrying cost plus any out of pocket costs subject to constraints on capacity, percent on-time delivery, and particular constraints on the ROQs (e.g., minimum, maximum, and ROQ increments).

At step 420, an incidental output of process is the "LaGrange multipliers" for the capacity constraints. These numbers are useful in that they represent the amount of reduction in the total cost of the objective (i.e., the total of WIP and stock carrying costs plus out-of-pocket costs) per unit of additional capacity (e.g., one extra hour of time available on a machine or for a worker). If this number is large compared to the cost of said capacity, then one should increase the capacity. However, if there is plenty of capacity, then these numbers will be zero indicating that capacity can be reduced. At step 425, the capacity should be adjusted until the LaGrange multipliers are reasonable compared to the cost of additional capacity. Once this is achieved, at step 430, the values of the ROQs and re-order points can be applied to the dynamic policy.

FIG. 15 is an equation showing the relation between demand (D), OOP cost (V), setup time (S), item cost (c), inventory carrying cost ratio (h) and ROQ (Q) and the LaGrange multipliers ($\lambda$), according to principles of the invention. The equation may be employed to determine an initial ROQ for each item in the data base. This initial ROQ may be modified by additional constraints such as minimum ROQ, maximum ROQ, and an ROQ increment. The ROQ is determined for every part (subscript i) and depends on parameters of the part itself as well as parameters of each resource (subscript k) which depend on parameters for each operation at the resource (subscript j). The initial ROQ is also influenced by the quantity, $\alpha$, which depends on the part and the resource. The resource dependency is a function of setup time and the fraction of demand that visits the operation at the given resource. Note that $\delta$ is equal to zero if the part does not visit the operation and therefore there is no contribution to $\alpha$. These terms are summed to generate $\alpha$ value for a for each part-resource pair. $\alpha$ represents the setup time required for a given part at a given resource. The LaGrange multiplier, $\lambda$, becomes the link between the setup of the item and the resource capacity. The process by which this dependency is determined is given in the flow diagram of FIG. 16, described in more detail below. The value of $\lambda$ is the amount that the total of the OOP cost and the WIP and inventory carrying cost can be reduced by increasing the capacity of the resource in question by one unit. For instance, if $\lambda$ is equal to $200 and the unit of capacity is one hour then one will be able to reduce the cost of the production plan by adding an additional hour so long as that additional hour cost less than $200. (This decision is made as part of step 425 of FIG. 14, for example).

Figure 16:
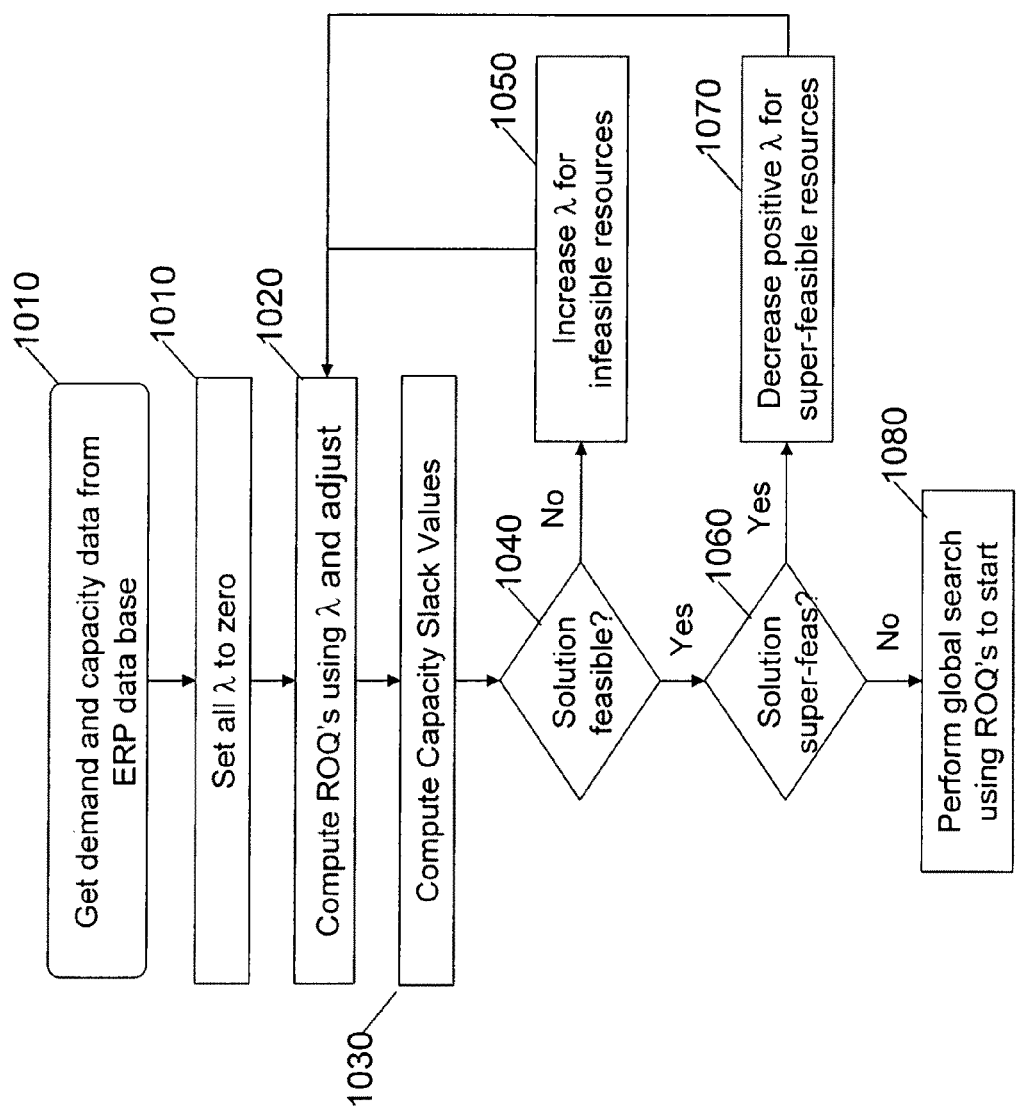
FIG. 16 is a flow diagram showing steps of an embodiment that may be used to determine an initial set of optimal re-order quantities, according to principles of the invention.

Those skilled in the art will know that a necessary condition for a production plan to be optimal is that $\lambda$ must be zero for any resource with abundant capacity and that there will be no extra (slack) capacity for any resource for which $\lambda$ is greater than zero. This notion is applied in FIG. 16. FIG. 16 is a flow diagram showing steps of an embodiment that may be used to determine an initial set of optimal re-order quantities, according to principles of the invention. Such an initial set may be subject to the aforementioned constraints on maximum, minimum and ROQ increment as well as other practical considerations. Moreover, it is likely that this set of ROQ values can be improved upon by applying a global search technique.

Continuing now with step 1010, data for demand and capacity from the ERP system are loaded. Such data may be stored in an ERP database (e.g., database 218) and may be obtained using a network (e.g., network 167) using an application programming interface. At step 1020, the LaGrange multipliers, $\lambda$, are first all set to zero. At step 1020, the ROQ values are computed and then adjusted according to ROQ size constraints (i.e., minimum, maximum, increment). At step 1030, using these computed ROQ values, the capacity slack values (available capacity minus capacity used by the plan) are computed for each resource. Those skilled in the art should realize that if the production plan resulting from all $\lambda$ values set to zero is feasible (i.e., it does not violate capacity constraints), then the plan is also optimal. At step 1040, the feasibility of the solution is checked by considering all the slack values (if all are positive, then the solution is feasible). If the solution is not feasible, at step 1050, the associated value of $\lambda$ should be increased. However, the solution may be "super-feasible" meaning that there is more than enough capacity everywhere and the cost of the plan can be reduced while remaining feasible. At step 1060, a check is made if the solution is super-feasible. An indication of this is having slack capacity when the associated $\lambda$ is positive. If this is the case, at step 1070, the value of the associated $\lambda$ is reduced. Such iterations continue until there are practically no infeasibilities as well as no super-feasibilities. Those skilled in the art will understand the significance of the term "practically" because it is virtually impossible to determine a set of $\lambda$ values that result in the slack values of tight resources that are exactly zero. Consequently, the process concludes when there are no infeasible constraints and when the super-feasibilities are not significant. An example of such a check would be whenever the slack is less than one percent of that available. Alternatively, the user might deem that there are no infeasible constraints and the super-feasibilities are not significant.

Those skilled in the art will also realize the need for the correction to the λ values to become smaller with each iteration in order to force convergence. This can be easily accomplished reducing the amount by which the λ values are adjusted with each iteration.

Once the feasibility and super-feasibility conditions are satisfied, at step 1080, a global search technique to improve on the ROQ's and to determine an optimal set of ROP's or PLT's is performed. Typical global search techniques include the "downhill simplex" technique of Nelder and Meade as well as conjugate direction methods. The global search technique would employ stochastic queueing and inventory models to determine an "objective function" that includes performance measures such as out-of-pocket costs, raw material, WIP, and finished goods inventory levels and also customer service levels. Several variations of the global objective exist and may include, in addition to the out-of-pocket costs and finished goods inventory carrying cost, WIP and raw material inventory carrying costs and as well as a cost of backorders. A different approach might include performing the global search only on the ROQ values and would subsequently determine a set of ROP's (or PLT's) that achieved a desired customer service level. Both approaches do not require constraints on capacity because (1) the initial solution is feasible and (2) the WIP grows prohibitively large when approaching the capacity limit. Thus, an unconstrained global search will likely result in an optimal set of ROP/PLT values and ROQ values.

Figure 17:
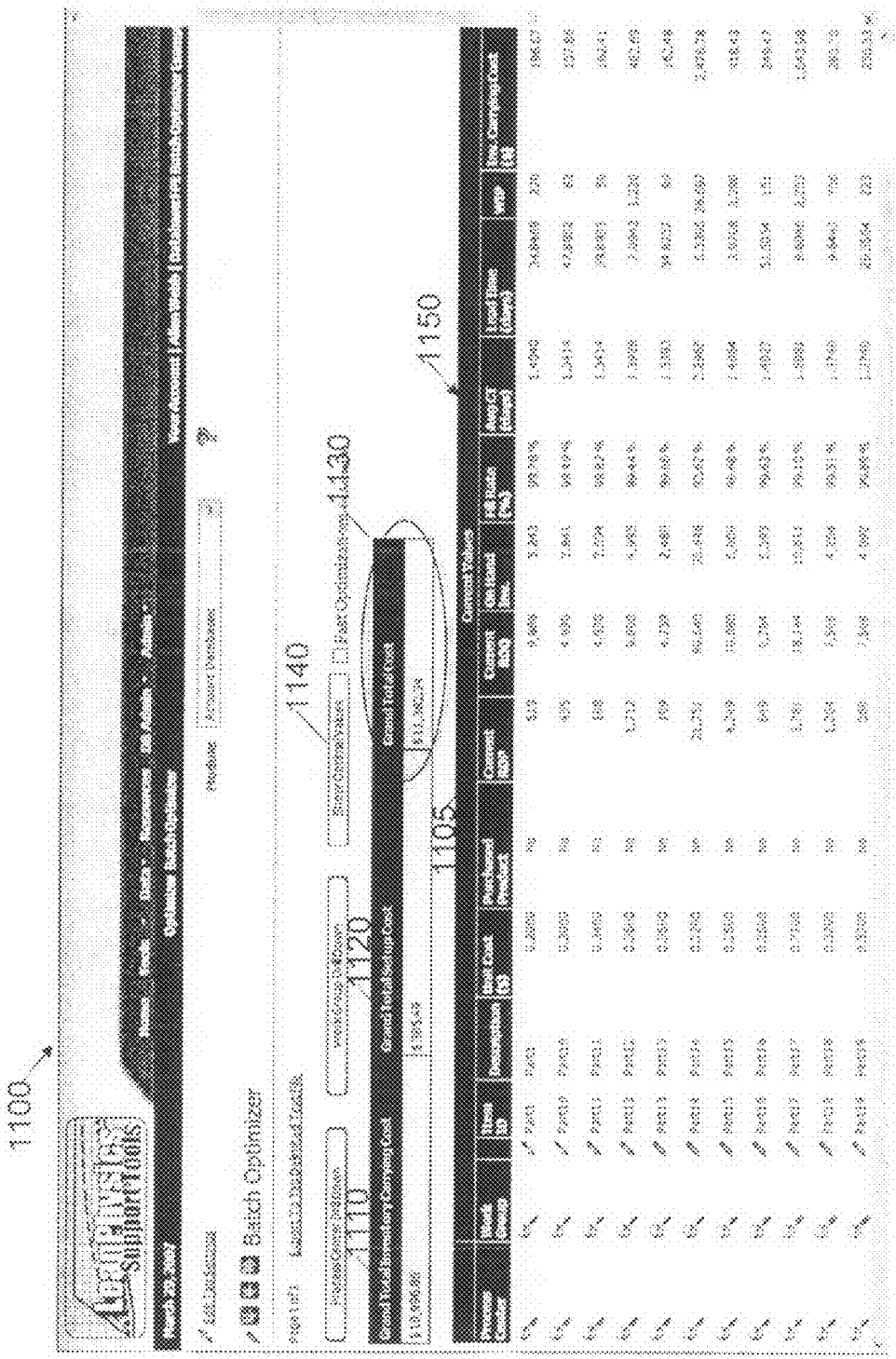
FIG. 17 is a representation of an exemplary graphical user interface (GUI) of the invention providing output and through which a user may input policy parameters and interact with the optimal Planning Module.

FIG. 17 is a representation of an exemplary graphical user interface (GUI) of the invention providing output and through which a user may input policy parameters and interact with the optimal Planning Module, generally denoted by reference numeral 1100. The current policy (Current ROQ/Current ROP) 1105 is displayed along with the resulting performance 1150 for each part (i.e., each "Item ID" such as Part1, Part10-Part19) that includes on-hand inventory, fill rate (percentage on-time), average cycle time, planned lead time, WIP, and inventory carrying cost. Also displayed are the total inventory carrying cost 1110, the total out-of-pocket cost 1120, and their sum 1130 which in this case is $11,382 (circled).

Figure 18:
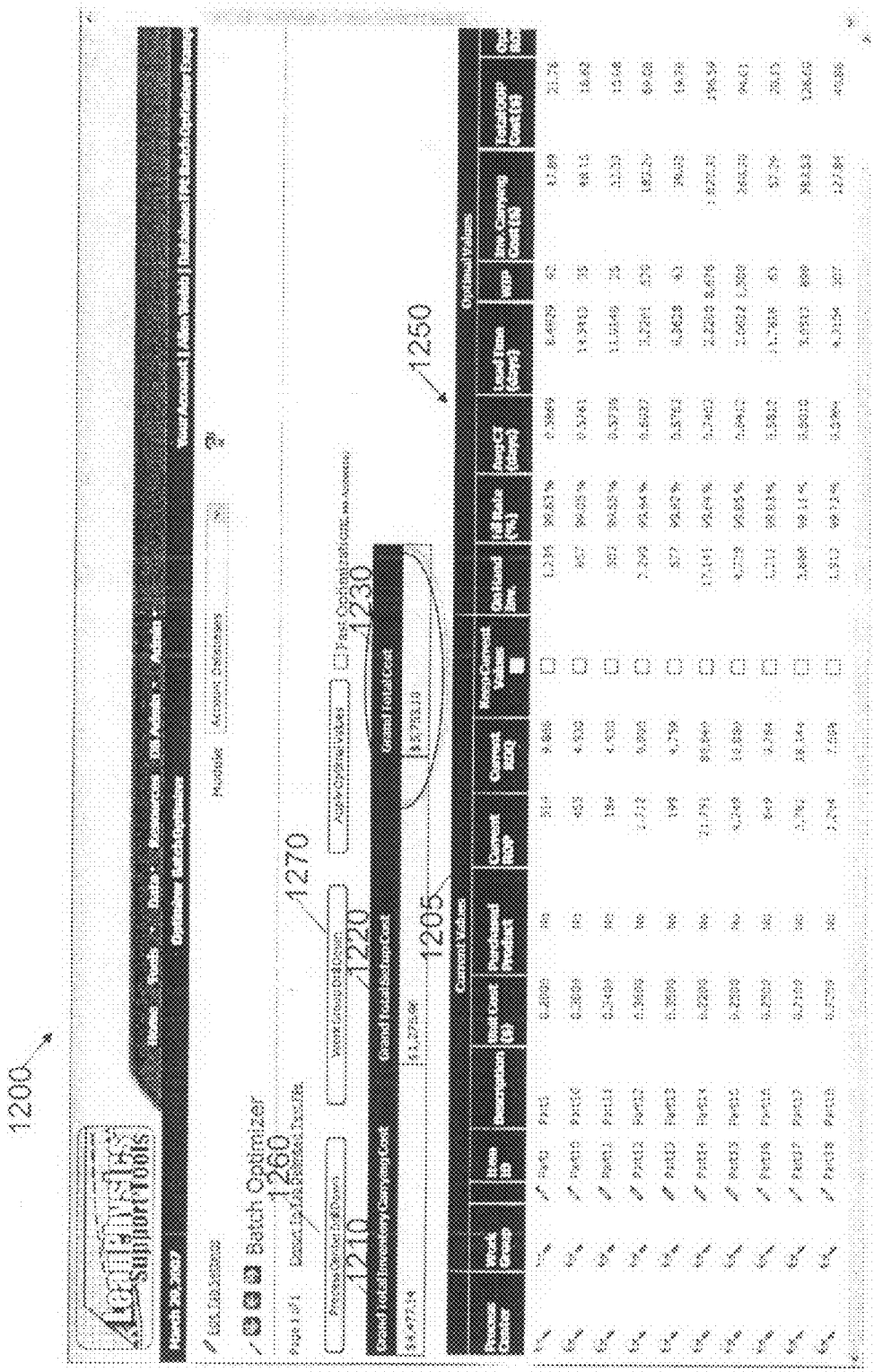
FIG. 18 is a representation of an exemplary graphical user interface (GUI) of the invention providing output showing the results after the optimization, according to principles of the invention.

FIG. 18 is a representation of an exemplary graphical user interface (GUI) of the invention providing output showing the results after the optimization, generally denoted by reference numeral 1200. The optimized policy (Current ROP/Current ROQ) 1205 is displayed along with the resulting performance for each part regarding inventory carrying cost, cycle time, out-of-pocket cost and on-time delivery 1250. The total inventory carrying cost 1210 and the total OOP cost 1220 is also displayed. The sum of these 1230 is also indicated which, in this case, is $5,753 (circled) indicating a significant savings over the previous policy. Two buttons on the screen allow the user to present the values of the LaGrange multipliers for both machine capacity (button 1260) and labor capacity (button 1270).

FIG. 19 is a representation of an exemplary graphical user interface (GUI) providing output showing the LaGrange multipliers for machine capacity, according to principles of the invention, generally denoted by reference numeral 1300. In this exemplary embodiment, results are displayed for each process center 1310 (i.e., column denoted by "Process Center ID") that include entries showing how much time is available (hrs/period), how much "Time Used" by the plan (hrs/period), the "Max Allowed Utilization" (%), and the resulting "Utilization" (%). The GUI also indicates the slack under the column titled, "Available Time Remaining" 1320, as well as the value of the LaGrange multiplier itself under the column titled, "Cost Decrease per Extra Hour Available" 1330. In this example only one process center has a positive LaGrange multiplier indicating that $41 could be saved from out-of-pocket costs and inventory carrying costs for every additional hour devoted to "PC 1."

Figure 20:
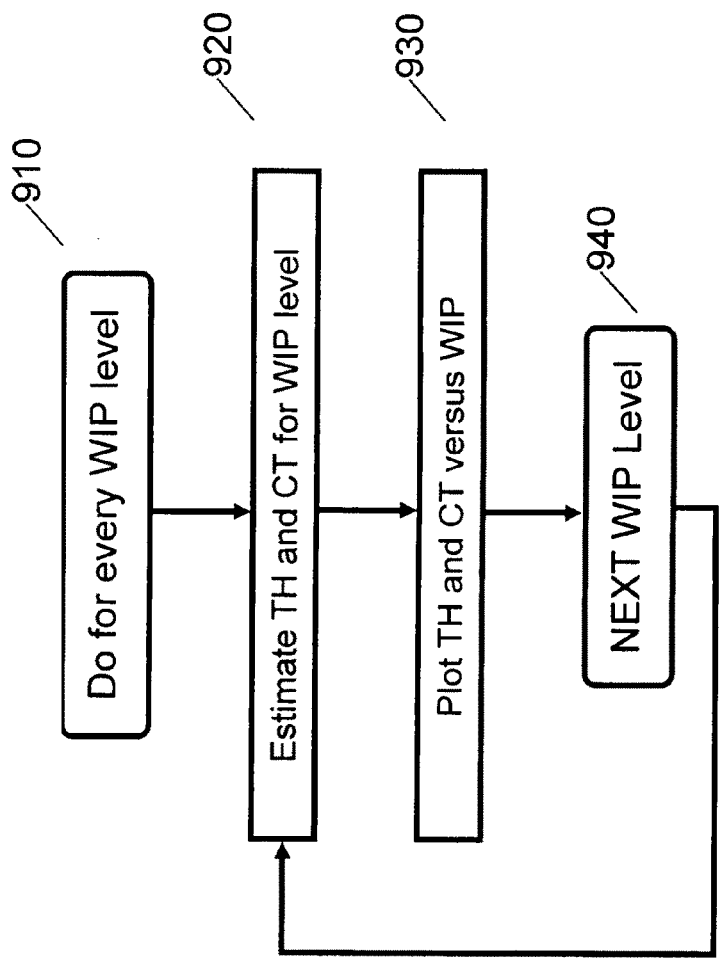
FIG. 20 is a flow diagram of steps of an embodiment used in the Planning module to determine optimal CONWIP levels for a flow, according to principles of the invention.

FIG. 20 is a flow diagram of steps of an embodiment used in the Planning module to determine optimal CONWIP levels for a flow, according to principles of the invention. As shown in this embodiment, a graphical output of cycle time (CT) and throughput (TH) for a plurality of WIP levels is provided for a single flow. This process improves the inherent intangibles concerning tradeoffs between longer cycle time and higher utilization of resources. Thus, instead of requiring the planner to specify a set of relative costs for cycle time and equipment utilization, this embodiment provides a broad set of alternatives to choose from (i.e., the various WIP levels).

The procedure is repeated for every WIP level desired, step 910. For a given WIP level, an estimation of the corresponding cycle time (CT) and throughput (TH) using either a Monte-Carlo simulation model or an approximate closed queueing network is calculated. In some embodiments, whenever an order is completed, a new one is pulled into the flow, thereby maintaining a constant WIP level with regard to orders. Other embodiments might consider the WIP in pieces while another may consider WIP in some common unit of measure (e.g., kilograms). If the system contains more than one type of product, new products are pulled in according to the probability of their occurrence in demand. Once the TH and CT are estimated, the values are typically stored and plotted, such as on the graphical user interface 930. This is repeated for each WIP level desired, step 940.

Figure 21:
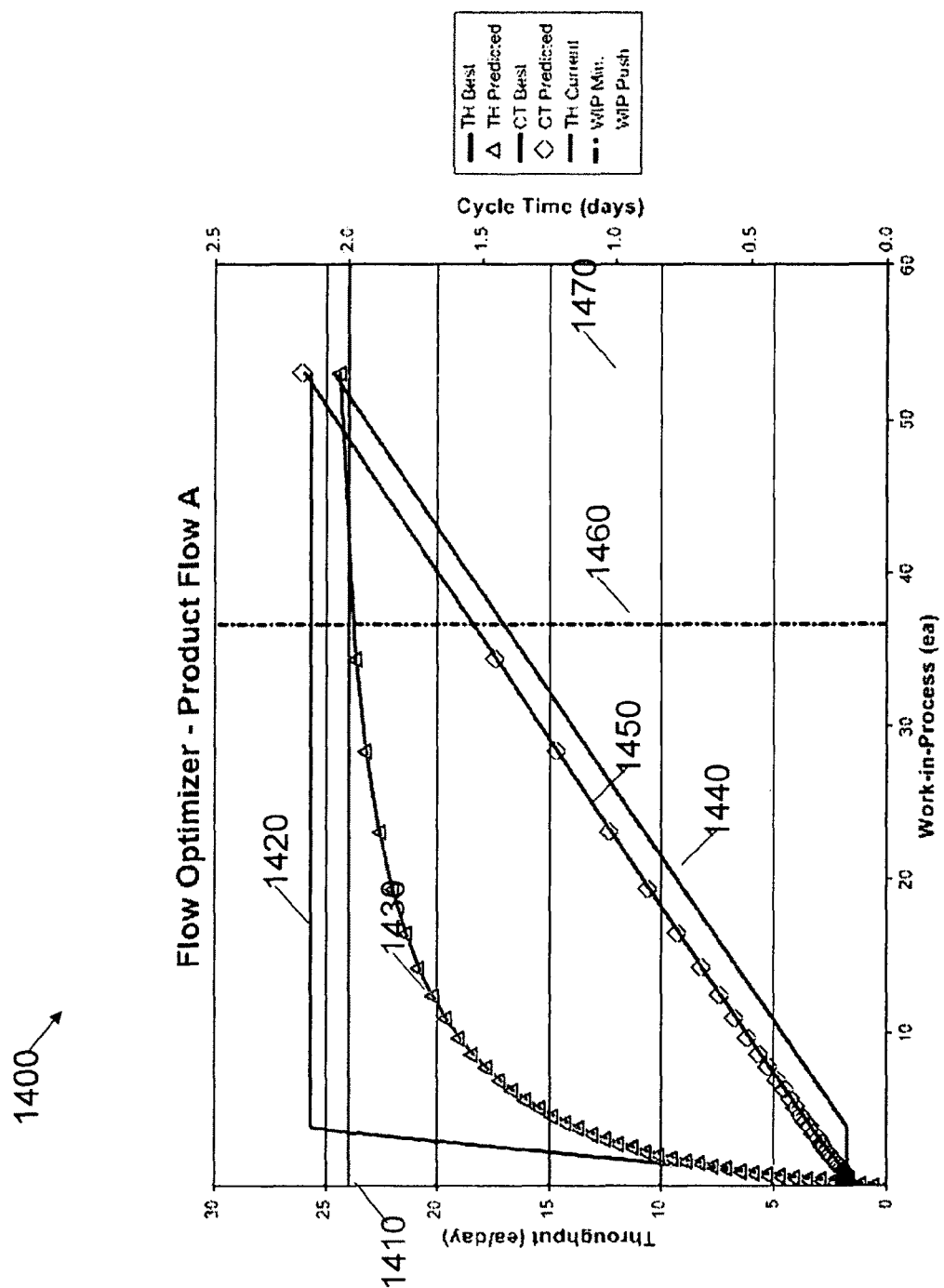
FIG. 21 is a graph showing the output of an embodiment of the optimal CONWIP level estimation tool, according to principles of the invention.

FIG. 21 is a graph showing the output of an embodiment of the optimal CONWIP level estimation tool, according to principles of the invention, generally denoted by reference numeral 1400. The GUI 1400 shows output for two plots of TH, one for the ideal case (solid line) 1420 and the other for what the flow is capable of (triangles) 1430. The GUI contrasts these output levels with the average overall demand (horizontal line) 1410. The GUI also contains output showing two plots of cycle time, one for the ideal case (solid line) 1440 and another for the flow in question (diamonds) 1450. Two vertical lines indicate, respectively, the minimum WIP required (around 37) 1460 and a recommended WIP (around 52) 1470. The minimum WIP indicates how much WIP is required to just meet demand on average. The recommended indicated how much WIP is required to meet demand more reliably. The decision is difficult because the more reliable WIP level requires cycle times that are approximately 25% longer.

FIG. 22 is a representation of a graphical user interface (GUI) of the invention showing the output of an embodiment of the CONWIP Sequence execution process, generally denoted by reference numeral 1500. Output includes general information 1510 such as schedule start and end date, planned production rate, etc., as well as the CONWIP limit 1520. Particular information for individual shop orders is also included in the output including the order of the work sequence 1530, the due dates 1540, early, late, and expected completion dates 1550, the due date status (i.e., early, late, on-time) 1560, and out indicating the status of the shop order 1570. In this exemplary embodiment, the status indicates whether the shop order is currently active (in WIP), completed, or should not be started (Wait).

FIG. 23A is a representation of a graphical user interface (GUI) of the invention showing the output of an embodiment of the Production/Demand Tracking with a Capacity Trigger, generally denoted by reference numeral 1610. FIG. 23A shows output for on-time delivery and inventory. FIG. 23B is a pie chart output showing how much overtime is used, in accordance with FIG. 23A, generally denoted by reference numeral 1620.

Figure 24B:
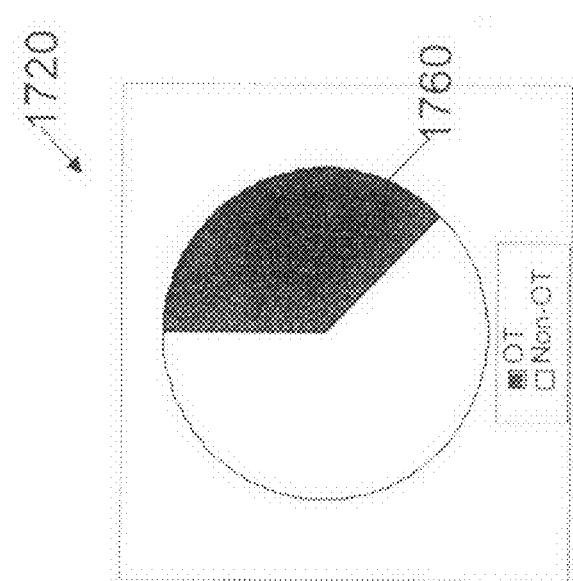
FIG. 24B is a pie chart reflecting overtime usage in accordance with the output of FIG. 24A.
Figure 24A:
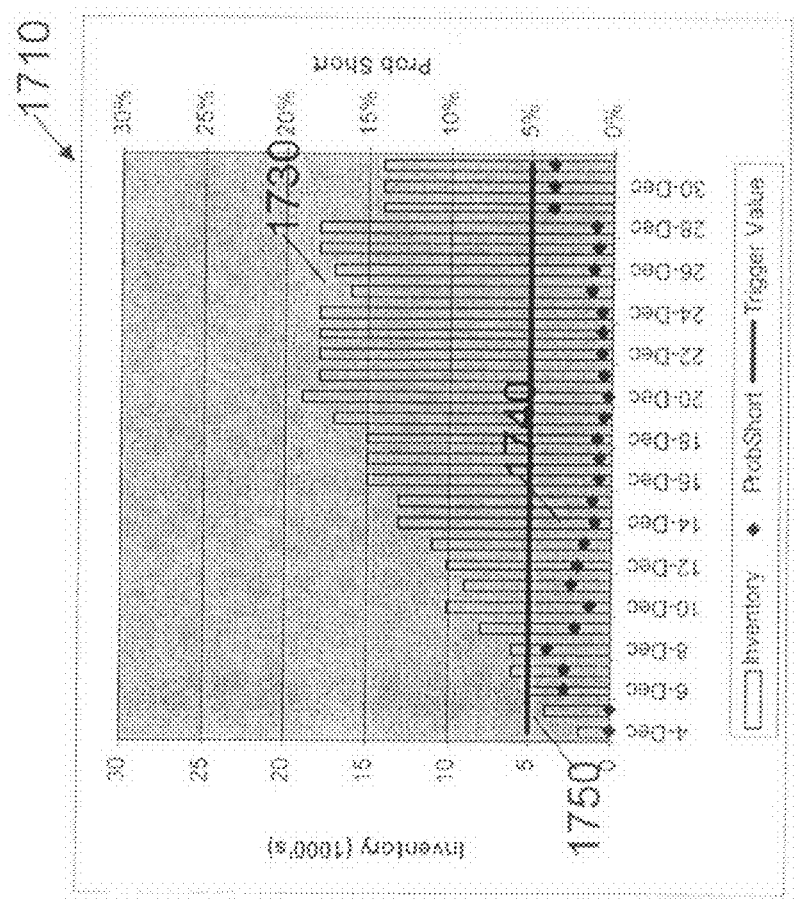
FIG. 24A is a representation of an exemplary graphical user interface (GUI) of the invention showing the output of an embodiment of the Production/Demand Tracking with a Capacity Trigger.

Referring now to FIG. 24A, the vertical bars 1630 denote the total expected inventory-days (TEID) while the solid diamonds 1640 denote overall probability of shortage (OPS). The solid line 1650 is output showing the Capacity Trigger. If any OPS point exceeds the Capacity Trigger, additional capacity should be considered. FIG. 24B may be considered an overtime graph and provides output in the form of a pie chart 1620 indicating that no overtime is being used 1660.

FIG. 24A is a representation of an exemplary graphical user interface (GUI) of the invention showing the output of an embodiment of the Production/Demand Tracking with a Capacity Trigger, generally denoted by 1710. FIG. 24B is a pie chart reflecting overtime usage in accordance with the output of FIG. 24A. FIG. 24A differs from FIG. 23A in that overtime is being used.

FIG. 24B is a pie chart reflecting overtime usage corresponding to the output of FIG. 24A and according to principles of the invention. Pie chart 1720 shows that about one third of the "pie" as indicating that one third of the available overtime is being used 1760. The chart 1710 is output that shows the predicted total expected inventory-days 1730 and the overall probability of shortage 1740 along with the Capacity Trigger 1750. In the case of FIG. 24A, because the production rate is greater while demand has remained constant, the TEID 1730 is higher then than shown in FIG. 23A, 1630, while the OPS 1740 is lower than 1640. Note that the OPS exceeds the Capacity Trigger on seven days when no overtime is used as in FIG. 23A; but never exceeds it when the overtime is used, as in FIG. 24A.

Various modifications and variations of the described methods and systems of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

I claim:

1. A system for applying a dynamic policy to a production control system, said system comprising:
   a dynamic risk-based scheduling (DRS) computer based system interoperably communicable with at least one of an enterprise resources planning (ERP) system, a manufacturing execution system (MES), and a generic manufacturing database, wherein the DRS system includes:
   a computer based optimal planning module that generates a dynamic policy comprising optimized parameters including optimized re-order quantities for balancing inventory levels, utilization of equipment and labor, and on-time delivery, and the optimized parameters used for generating an evolving schedule as changes in demand and production capacity arise; and
   a computer based execution module that applies the dynamic policy to accommodate changes in demand or capacity without rescheduling.

2. The system of claim 1, wherein the DRS system is interoperably communicable with both the ERP system and the MES system and wherein:
   the optimal planning module receives demand, capacity and cost data from the ERP system and returns optimal parameters to the MES system including at least any one of: a re-order point (ROP), a re-order quantity (ROQ), a planned lead time (PLT), and a CONWIP level to the ERP system.

3. The system of claim 2, wherein the ERP system releases information related to at least one shop order based on the optimal parameters.

4. The system of claim 2, wherein the MES system provides work-in-process (WIP) location information to the execution module.

5. The system of claim 1, wherein the execution module provides a release signal based at least in part on the optimal parameters.

6. The system of claim 1, wherein the execution module provides a trigger signal based at least in part of the optimal parameters to indicate one of an overcapacity and an under capacity.

7. The system of claim 1, wherein the optimized parameters include any of: a re-order point (ROP), a re-order quantity (ROQ), planned lead time (PLT) for one or more items, and a CONWIP level for one or more flows.

8. The system of claim 1, wherein the DRS determines a probability of shortage for the demand associated with each of a plurality of orders.

9. The system of claim 1, wherein the dynamic risk-based scheduling (DRS) system interoperably communicates with the at least one of an enterprise resources planning (ERP) system, a manufacturing execution system (MES), and a generic manufacturing data base.

10. The system of claim 1, wherein the dynamic policy includes a set of optimized ERP parameters, including any of: a re-order point (ROP), a re-order quantity (ROQ), planned lead time (PLT) for one or more items, and a CONWIP level for one or more flows, that operate as a time-phased reorder point system to generate both make-to-order and make-to-stock shop orders thereby pulled into production according to the CONWIP protocol.

11. The system of claim 1 wherein the dynamic policy can accommodate changes in demand and/or capacity without rescheduling by employing the CONWIP protocol which results in both an ability to increase production automatically in response to increasing demand by increasing the rate of release of shop orders, and an ability to decrease production automatically in response to decrease demand and/or decrease in capacity by decreasing the rate of release of shop orders.

12. The system of claim 7, wherein a plurality of optimized lot size (ROQ) values is determined by considering a plurality of available capacities and for each available capacity computing a LaGrange multiplier for each of a plurality of resources such that the product of the LaGrange multiplier and the associated slack values is or is near zero.

13. The system of claim 12, wherein a plurality of optimized reorder point (ROP) values is determined using the determined ROQ values that result in a desired customer service level.

14. The system of claim 7, wherein the optimized CONWIP level is determined by employing a stochastic queuing model to estimate the throughput and cycle time for a plurality of WIP levels resulting in two plots: throughput versus WIP and cycle time versus WIP.

15. The system of claim 12, wherein the optimized ROQ is further determined by applying the resulting ROQ values to a stochastic queuing and inventory model to evaluate an objective function that includes performance measures such as out-of-pocket costs, raw material, WIP, and finished goods inventory and choosing the set of ROQ values that minimize the objective function.

* * * * *